United States Patent
Xiang et al.

(10) Patent No.: US 9,412,375 B2
(45) Date of Patent: Aug. 9, 2016

(54) METHODS AND APPARATUSES FOR REPRESENTING A SOUND FIELD IN A PHYSICAL SPACE

(71) Applicant: QUALCOMM Incorporated, San Diego, CA (US)

(72) Inventors: Pei Xiang, San Diego, CA (US); Kexi Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 13/725,951

(22) Filed: Dec. 21, 2012

(65) Prior Publication Data

US 2014/0133665 A1    May 15, 2014

Related U.S. Application Data

(60) Provisional application No. 61/726,451, filed on Nov. 14, 2012, provisional application No. 61/726,456, filed on Nov. 14, 2012, provisional application No. 61/726,441, filed on Nov. 14, 2012, provisional application No. 61/726,461, filed on Nov. 14, 2012.

(51) Int. Cl.
*H04R 29/00* (2006.01)
*G10L 17/00* (2013.01)
(Continued)

(52) U.S. Cl.
CPC ............... *G10L 17/00* (2013.01); *G06F 3/167* (2013.01); *H04R 3/005* (2013.01); *H04R 29/002* (2013.01); *H04S 7/303* (2013.01); *H04S 7/40* (2013.01);
(Continued)

(58) Field of Classification Search
CPC .............................. H04R 29/001; H04R 29/00
USPC ..................................... 381/17, 59; 348/14.08
See application file for complete search history.

(56) References Cited

U.S. PATENT DOCUMENTS

| 4,731,848 A | * | 3/1988 | Kendall et al. ................. 381/63 |
| 5,666,136 A | | 9/1997 | Fujishita et al. |

(Continued)

FOREIGN PATENT DOCUMENTS

| EP | 2031418 A1 | 3/2009 |
| WO | 2008051661 A1 | 5/2008 |

(Continued)

OTHER PUBLICATIONS

International Preliminary Report on Patentability from International Application No. PCT/US2013/064707, dated Oct. 15, 2014, 20 pp.

(Continued)

*Primary Examiner* — Simon King
(74) *Attorney, Agent, or Firm* — Shumaker & Sieffert, P.A.

(57) ABSTRACT

Methods and apparatuses for representing a sound field in a physical space are provided and described as embodied in a system that includes a sound transducer array along with a touch surface-enabled display table. The array may include a group of transducers (multiple speakers and/or microphones). The array may be configured to perform spatial processing of signals for the group of transducers so that sound rendering (in configurations where the array includes multiple speakers), or sound pick-up (in configurations where the array includes multiple microphones), may have spatial patterns (or sound projection patterns) that are focused in certain directions while reducing disturbances from other directions.

61 Claims, 21 Drawing Sheets

Top View

(51) Int. Cl.
*G06F 3/16* (2006.01)
*H04R 3/00* (2006.01)
*H04S 7/00* (2006.01)

(52) U.S. Cl.
CPC .... *G10H 2210/301* (2013.01); *G10H 2220/096* (2013.01); *G10H 2220/355* (2013.01)

(56) References Cited

U.S. PATENT DOCUMENTS

| | | | |
|---|---|---|---|
| 5,839,109 A * | 11/1998 | Iwamida | 704/271 |
| 6,545,669 B1 | 4/2003 | Kinawi et al. | |
| 6,826,284 B1 | 11/2004 | Benesty et al. | |
| 6,850,496 B1 * | 2/2005 | Knappe | H04M 3/56 370/260 |
| 7,778,739 B2 | 8/2010 | Preston et al. | |
| 7,843,486 B1 | 11/2010 | Blair et al. | |
| 7,920,158 B1 | 4/2011 | Beck et al. | |
| 7,995,732 B2 | 8/2011 | Koch et al. | |
| 8,045,736 B2 | 10/2011 | Shibata et al. | |
| 8,050,917 B2 | 11/2011 | Caspi et al. | |
| 8,174,934 B2 | 5/2012 | Li et al. | |
| 8,280,404 B1 | 10/2012 | Roskind | |
| 8,627,213 B1 | 1/2014 | Jouppi et al. | |
| 8,676,581 B2 | 3/2014 | Flaks et al. | |
| 8,744,065 B2 | 6/2014 | Edholm et al. | |
| 2002/0089541 A1 | 7/2002 | Orbanes et al. | |
| 2003/0006965 A1 | 1/2003 | Bohn | |
| 2003/0217871 A1 | 11/2003 | Chao et al. | |
| 2004/0013252 A1 | 1/2004 | Craner | |
| 2004/0080494 A1 | 4/2004 | Fahlman | |
| 2004/0109023 A1 | 6/2004 | Tsuchiya | |
| 2004/0125942 A1 | 7/2004 | Beaucoup et al. | |
| 2005/0135583 A1 | 6/2005 | Kardos | |
| 2006/0238495 A1 | 10/2006 | Davis | |
| 2007/0075968 A1 | 4/2007 | Hall et al. | |
| 2007/0127668 A1 | 6/2007 | Ahya et al. | |
| 2007/0195012 A1 | 8/2007 | Ichikawa et al. | |
| 2007/0217590 A1 | 9/2007 | Loupia et al. | |
| 2008/0019531 A1 | 1/2008 | Kimijima | |
| 2008/0101624 A1 | 5/2008 | Schentrup et al. | |
| 2008/0165992 A1 | 7/2008 | Kondo et al. | |
| 2008/0189115 A1 | 8/2008 | Mayer-Ullmann | |
| 2008/0252595 A1 | 10/2008 | Boillot | |
| 2008/0253592 A1 | 10/2008 | Sanders et al. | |
| 2008/0255901 A1 * | 10/2008 | Carroll | G06Q 30/0237 705/14.37 |
| 2008/0259731 A1 | 10/2008 | Happonen | |
| 2009/0003659 A1 | 1/2009 | Forstall et al. | |
| 2009/0015594 A1 | 1/2009 | Baba | |
| 2009/0080632 A1 | 3/2009 | Zhang et al. | |
| 2009/0199111 A1 | 8/2009 | Emori et al. | |
| 2009/0214052 A1 | 8/2009 | Liu et al. | |
| 2009/0299745 A1 | 12/2009 | Kennewick et al. | |
| 2010/0020951 A1 | 1/2010 | Basart et al. | |
| 2010/0073454 A1 | 3/2010 | Lovhaugen et al. | |
| 2010/0157726 A1 | 6/2010 | Ando et al. | |
| 2010/0302401 A1 | 12/2010 | Oku et al. | |
| 2010/0303247 A1 | 12/2010 | Sinivaara | |
| 2010/0323652 A1 | 12/2010 | Visser et al. | |
| 2011/0013075 A1 | 1/2011 | Kim et al. | |
| 2011/0025635 A1 | 2/2011 | Lee | |
| 2011/0025916 A1 * | 2/2011 | Kohara | H04S 7/30 348/563 |
| 2011/0055703 A1 | 3/2011 | Lundback et al. | |
| 2011/0058662 A1 | 3/2011 | Yoakum et al. | |
| 2011/0069643 A1 | 3/2011 | Yoakum et al. | |
| 2011/0096941 A1 * | 4/2011 | Marzetta | G06F 3/013 381/92 |
| 2011/0109937 A1 | 5/2011 | Fujiki et al. | |
| 2011/0304632 A1 | 12/2011 | Evertt et al. | |
| 2012/0022924 A1 | 1/2012 | Runnels et al. | |
| 2012/0027226 A1 | 2/2012 | Desenberg | |
| 2012/0041579 A1 | 2/2012 | Davis et al. | |
| 2012/0052972 A1 | 3/2012 | Bentley | |
| 2012/0068964 A1 | 3/2012 | Wright et al. | |
| 2012/0086631 A1 | 4/2012 | Osman et al. | |
| 2012/0098921 A1 | 4/2012 | Stedman et al. | |
| 2012/0124602 A1 | 5/2012 | Tan et al. | |
| 2012/0163610 A1 | 6/2012 | Sakagami | |
| 2012/0176467 A1 | 7/2012 | Kenoyer | |
| 2012/0182429 A1 | 7/2012 | Forutanpour et al. | |
| 2012/0262536 A1 * | 10/2012 | Chen et al. | 348/14.08 |
| 2012/0293405 A1 | 11/2012 | Iida et al. | |
| 2012/0297400 A1 | 11/2012 | Hill et al. | |
| 2012/0316869 A1 | 12/2012 | Xiang et al. | |
| 2013/0144629 A1 | 6/2013 | Johnston et al. | |
| 2013/0156220 A1 | 6/2013 | Bar-Zeev et al. | |
| 2013/0259254 A1 | 10/2013 | Xiang et al. | |
| 2013/0278499 A1 | 10/2013 | Anderson | |
| 2014/0013192 A1 | 1/2014 | McGuiggan et al. | |
| 2014/0136203 A1 | 5/2014 | Liu et al. | |
| 2014/0136981 A1 | 5/2014 | Xiang et al. | |
| 2014/0198029 A1 | 7/2014 | Dang et al. | |
| 2015/0046157 A1 | 2/2015 | Wolff et al. | |
| 2015/0170210 A1 | 6/2015 | Rhee et al. | |

FOREIGN PATENT DOCUMENTS

| | | |
|---|---|---|
| WO | 2011076286 A1 | 6/2011 |
| WO | 2011076290 A1 | 6/2011 |

OTHER PUBLICATIONS

International Search Report and Written Opinon from International Application No. PCT/US2013/064707, dated Jan. 22, 2014, 10 pp.

* cited by examiner

*Top View*

*Top View*

Top View

*Top View*

*Top View*

Top View

*Top View*

Top View

METHODS AND APPARATUSES FOR REPRESENTING A SOUND FIELD IN A PHYSICAL SPACE

CLAIM OF PRIORITY UNDER 35 U.S.C. §119(e)

The present application for patent claims priority to and benefit of U.S. Provisional Application No. 61/726,451, entitled "Device and System for Refreshing a Sound Field in a Physical Space" filed Nov. 14, 2012, U.S. Provisional Application No. 61/726,456, entitled "Method and Apparatus for Providing Tangible Control of Sound" filed Nov. 14, 2012, U.S. Provisional Patent Application No. 61/726,441, filed Nov. 14, 2012, entitled "Device and System Having Smart Directional Conferencing", and U.S. Provisional Patent Application No. 61/726,461 filed Nov. 14, 2012, entitled "Collaborative Document Review and Editing".

FIELD

Various features relate to a device and a system for representing a sound field in a physical space.

BACKGROUND

Sound is a mechanical wave that is an oscillation of pressure transmitted through a solid, liquid, or gas, composed of frequencies within the range of hearing. In humans, for example, hearing is normally limited to frequencies between about 20 Hz and 20,000 Hz (20 kHz). Although these sounds may be heard, they cannot be seen. As human visual perception trumps all other senses, being able to visualize sound would greatly enhance user experiences.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

A first example provides a method for representing a sound field in a physical space. The method includes capturing sound from the physical space by a sound transducer array in communication with the physical space. The physical space may include a display screen, a touch screen and a tablet. Once the sound has been captured, a sound projection pattern of the captured sound may be calculated where the sound projection pattern is a representation of a sound field of the captured sound. The sound projection pattern may then be displayed on the physical space extending between the sound transducer array and an intended user. The sound projection pattern may be displayed in real-time or near real-time.

According to one aspect, the sound may be captured in real-time or near real-time and may include subsonic sounds, ultrasonic sounds, infrared sounds, and radio frequency sounds. Additionally, the captured sound may be processed to identify an originating location of the captured sound. The intended user may be at the originating location of the captured sound.

According to one aspect, the sound transducer array may comprise a separate microphone array and speaker array. When the microphone array is separate from the speaker array, a microphone beam may be captured on the microphone array and displayed in the physical space in a first color while a speaker beam may be transmitted from the speaker array and displayed in the physical space in a second color where the first color is different than the second color. Next, a color heat map may be applied to the microphone beam where a main lobe of the color heat map represents a strong signal region and color changes in the color heat map represent weaker signal regions.

According to one aspect, the sound transducer array may comprise a combined microphone and speaker array. When the microphone and speaker arrays are combined, a microphone beam may be captured on the sound transducer array and displayed in the physical space in a first color while a speaker beam may be transmitted from the sound transducer array and displayed in the physical space in a second color where the first color is different than the second color. Next, a color heat map may be applied to the microphone beam where a main lobe of the color heat map represents a strong signal region and color changes in the color heat map represent weaker signal regions.

According to one embodiment, the sound projection pattern may be in the form of beam patterns or a symbol, such as an arrow.

A second example provides a sound transducer array. The sound transducer array may include a speaker array, a microphone array, in communication with the speaker array, for capturing sound and at least one processor in communication with the microphone array. The at least one processor may be configured to capture the sound and calculate a sound projection pattern of the captured sound, where the sound projection pattern is a representation of a sound field of the captured sound. Next, the at least one processor may be configured to display the sound projection pattern on the physical space extending between the sound transducer array and an intended user. The sound projection pattern may be displayed in real-time or near real-time and the physical space may include a display screen, a touch screen and a tablet.

According to one aspect, the sound may be captured in real-time or near real-time and may include subsonic sounds, ultrasonic sounds, infrared sounds, and radio frequency sounds. Additionally, the at least one processor may be further configured to process the captured sound to identify an originating location of the captured sound. The intended user may be at the originating location of the captured sound.

According to one aspect, the at least one processor may be further configured to capture a microphone beam on the microphone array, where the microphone beam is displayed in the physical space in a first color and transmit a speaker beam from the speaker array, where the speaker beam is displayed in the physical space in a second color where the first color is different than the second color. The at least one processor may be further configured to then apply a color heat map to the microphone beam where a main lobe of the color heat map represents a strong signal region and color changes in the color heat map represent weaker signal regions. The microphone array may be combined with the speaker array. Alternatively, the microphone array may be separate from the speaker array.

According to one embodiment, the sound projection pattern may be in the form of beam patterns or a symbol, such as an arrow.

A third example provides a sound transducer array in communication with a physical space for representing a sound field in the physical space. The sound transducer array may include means for capturing sound from the physical space, where the sound is emitted into the physical space by a sound transducer array in communication with the physical space. The physical space may include a display screen, a touch screen and a tablet.

The sound transducer array may also include means for calculating a sound projection pattern of the captured sound, where the sound projection pattern is a representation of a sound field of the captured sound and means for displaying the sound projection pattern on the physical space extending between the sound transducer array and an intended user. The sound projection pattern may be displayed in real-time or near real-time.

According to one aspect, the sound may be captured in real-time or near real-time and may include subsonic sounds, ultrasonic sounds, infrared sounds, and radio frequency sounds. Additionally, the sound transducer array may include means for processing the captured sound to identify an originating location of the captured sound. The intended user may be at the originating location of the captured sound.

According to one aspect, the sound transducer array may comprise a separate microphone array and speaker array. When the microphone array is separate from the speaker array, the sound transducer may further comprise means for capturing a microphone beam on the microphone array and displaying in the physical space in a first color as well as means for transmitting a speaker beam from the speaker array, the speaker beam is displayed in the physical space in a second color where the first color is different than the second color. The sound transducer may further comprise means for applying a color heat map to the microphone beam where a main lobe of the color heat map represents a strong signal region and color changes in the color heat map represent weaker signal regions.

According to one aspect, the sound transducer array may comprise a combined microphone and speaker array. When the microphone array is combined with the speaker array, the sound transducer may further comprise means for capturing a microphone beam on the microphone array and displaying in the physical space in a first color as well as means for transmitting a speaker beam from the speaker array, the speaker beam is displayed in the physical space in a second color where the first color is different than the second color. The sound transducer may further comprise means for applying a color heat map to the microphone beam where a main lobe of the color heat map represents a strong signal region and color changes in the color heat map represent weaker signal regions.

According to one embodiment, the sound projection pattern may be in the form of beam patterns or a symbol, such as an arrow.

A fourth example provides a computer readable storage medium that includes one or more instructions for representing a sound field in the physical space which when executed by at least one processor, causes the at least one processor to capture sound from the physical space, where the sound is emitted into the physical space by a sound transducer array in communication with the physical space and calculate a sound projection pattern of the captured sound, where the sound projection pattern is a representation of a sound field of the captured sound. Next, the at least one processor may display the sound projection on the physical space extending between the sound transducer array and an intended user. The sound projection pattern may be displayed in real-time or near real-time and the physical space may include a display screen, a touch screen and a tablet.

According to one aspect, the sound may be captured in real-time or near real-time and may include subsonic sounds, ultrasonic sounds, infrared sounds, and radio frequency sounds. Additionally, the at least one processor may process the captured sound to identify an originating location of the captured sound. The intended user may be at the originating location of the captured sound.

According to one aspect, the sound transducer array may comprise a separate microphone array and speaker array. When the microphone array is separate from the speaker array, the at least one processor may capture a microphone beam on the microphone array and display in the physical space in a first color as well as transmit a speaker beam from the speaker array, where the speaker beam is displayed in the physical space in a second color where the first color is different than the second color. The at least one processor may apply a color heat map to the microphone beam where a main lobe of the color heat map represents a strong signal region and color changes in the color heat map represent weaker signal regions.

According to one aspect, the sound transducer array may comprise a combined microphone and speaker array. When the microphone array is combined with the speaker array, the at least one processor may capture a microphone beam on the microphone array and display in the physical space in a first color as well as transmit a speaker beam from the speaker array, where the speaker beam is displayed in the physical space in a second color where the first color is different than the second color. The at least one processor may also apply a color heat map to the microphone beam where a main lobe of the color heat map represents a strong signal region and color changes in the color heat map represent weaker signal regions.

According to one embodiment, the sound projection pattern may be in the form of beam patterns or a symbol, such as an arrow.

DRAWINGS

Various features, nature and advantages may become apparent from the detailed description set forth below when taken in conjunction with the drawings in which like reference characters identify correspondingly throughout.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Figure 1:
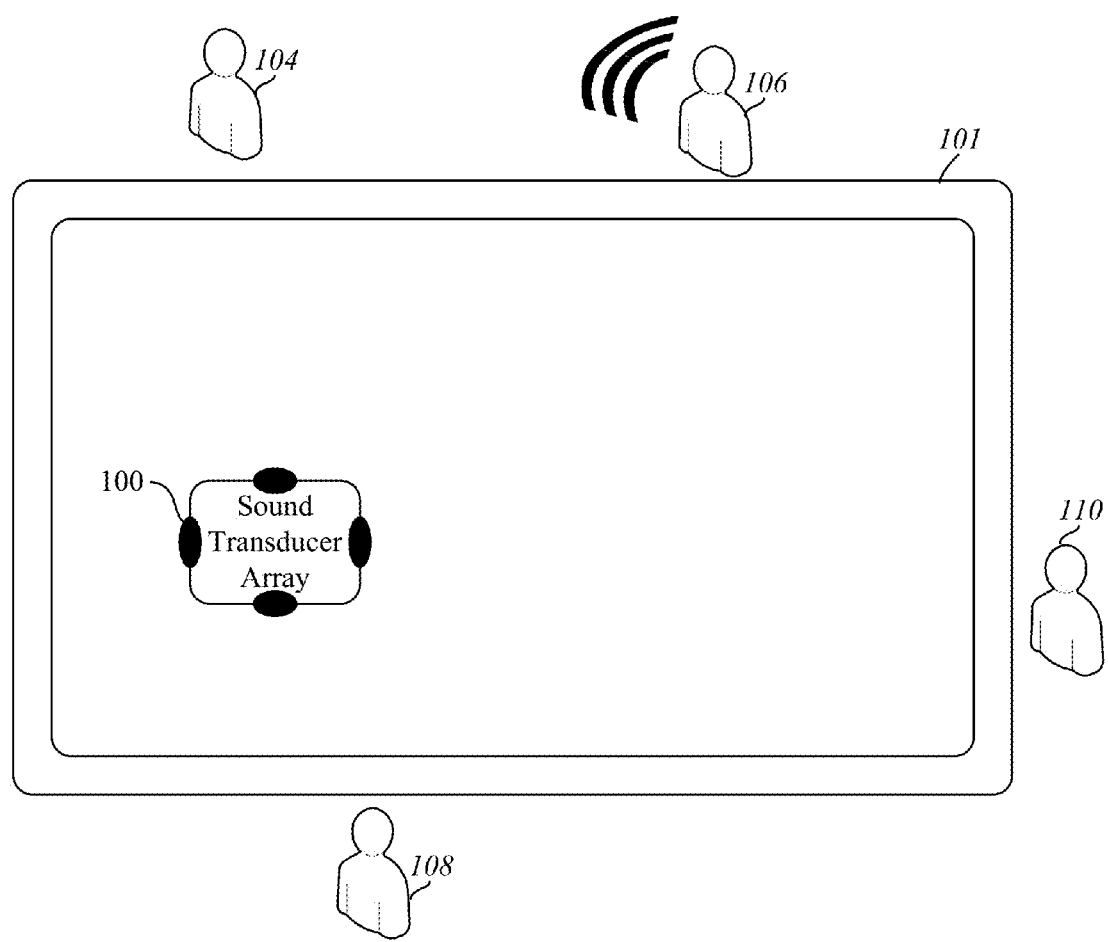
FIG. 1 illustrates an example of a typical system using a sound transducer array.

FIG. 1 illustrates an example of a typical system using a sound transducer array. As shown, the system includes a sound transducer array 100 located on a conference table 101. The sound transducer array 100 includes several microphones/speakers arranged in a manner to capture sound (or audio) from different directions. As an example, four individuals 104-110 may be located around of a conference table. One individual 106 may be speaking and the sound is captured by the sound transducer array 100; however there is no representation of the sound field of the captured sound either symbolically or visually on the conference table. Consequently, there is no confirmation that the sound transducer array 100 is focused on the individual 106 speaking and/or capturing the sound.

Various aspects of the method and apparatus for representing and controlling a sound field in a physical space (e.g. physical surface) are described herein as embodied in a system that includes a sound transducer array (referred to herein as "sound transducer array", "transducer array" or simply "an array") along with a touch surface-enabled display table. The array may include a group of transducers (multiple speakers and/or microphones). The array may be configured to perform spatial processing of signals for the group of transducers so that sound rendering (in configurations where the array includes multiple speakers), or sound pick-up (in configurations where the array includes multiple microphones), may have spatial patterns that are focused in certain directions while reducing disturbances from other directions.

Figure 2:
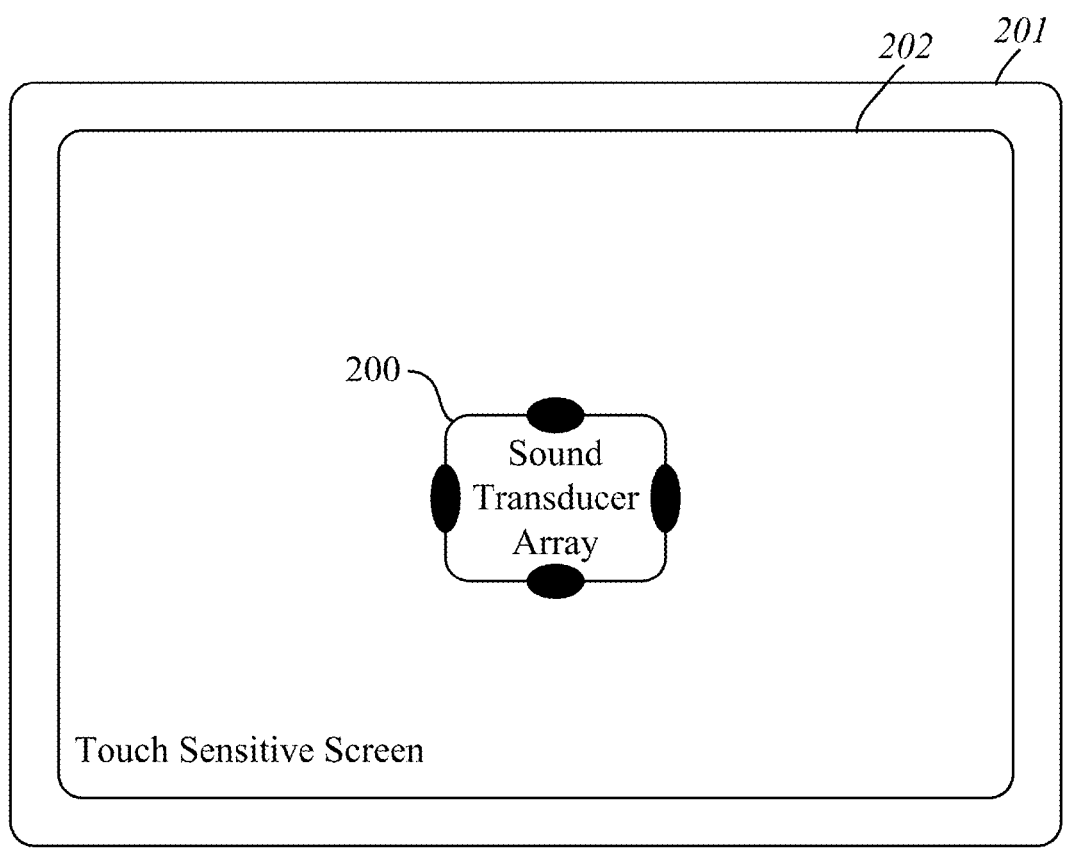
FIG. 2 illustrates a system that includes a sound transducer array and a device having a touch sensitive screen.

FIG. 2 illustrates a system that includes a sound transducer array and a device having a touch sensitive screen. As shown in FIG. 2, the system may include a sound transducer array 200 and a device 201.

In some implementations, the sound transducer array 200 may include at least one processor, a memory, several microphones and speakers, at least one transceiver, several inductive elements, a compass, at least one communication interface, and at least one identification marker. The microphones and speakers of the sound transducer array 200 may be arranged in a manner to capture sound, audio or microphone beams from different directions and to transmit a speaker beam that is displayed in the physical space, respectively. For example, the microphones and speakers may be arranged linearly, in a circle or any other arrangements. The sound transducer array 200 may communicate with the device 201 by using a communication interface and at least one transceiver. In some implementations, the transceiver provides a wireless communication link (for receiving and transmitting data) between the sound transducer array 200 and the device 201. Different implementations may use different communication protocols to communicate between the sound transducer array 200 and the device 201. Examples of communication protocols include near-field communication (NFC), Wi-Fi, Bluetooth, ZigBee, Digital Living Network Alliance (DLNA), and Airplay.

In some implementations, the compass provides a way for the sound transducer array 200 to determine its orientation. The orientation information may be used internally or may be passed on to other devices (e.g., device 201) in order to determine the position and/or orientation of the sound transducer array in some implementations. The inductive elements may also be used to determine the position and/or orientation of the sound transducer array. For example, the inductive elements may be used by a device (e.g., device 201) to determine the position and orientation of the sound transducer array on a touch sensitive screen. The identification marker may also be used to determine the position and/or orientation of the microphones and speakers.

The above description is an overview of possible components/elements of a sound transducer array. A more detailed description of components/elements of a sound transducer array will be further described below with reference to FIG. 16.

Furthermore, as shown in FIG. 2, the device 201 may include a touch sensitive screen 202. The touch sensitive screen 202 may be used for providing tangible control of sound. The touch sensitive screen 202 may also be used for sensing and capturing user movements (e.g., movement of finger on the touch screen). In some implementations, the device 201 and the touch sensitive screen 202 is integrated in a surface table.

In addition to the touch sensitive screen 202, the device 201 may also include at least one processor, a memory, at least one transceiver, and at least one communication interface. In some implementations, the above components allow the device 201 to communicate with the sound transducer array 200, local and remote computers, wireless devices (e.g., phones), portable computer devices (e.g., tablets). The components/elements of the device 201 will be further described below with reference to FIG. 17.

Having provided an overview of the various devices and components of a system for representing and controlling a sound field in a physical space, a detailed description of how these devices are used in such a system will now be described.

Several example use cases for the array are described with reference to FIGS. 3-6. These use cases may be displayed on a surface table, such as a conference table, or on one or more tablets, where each individual has a separate tablet. A system in which a plurality of individuals, each of which utilizes a tablet, will be further described below with reference to FIG. 18.

Figure 3:
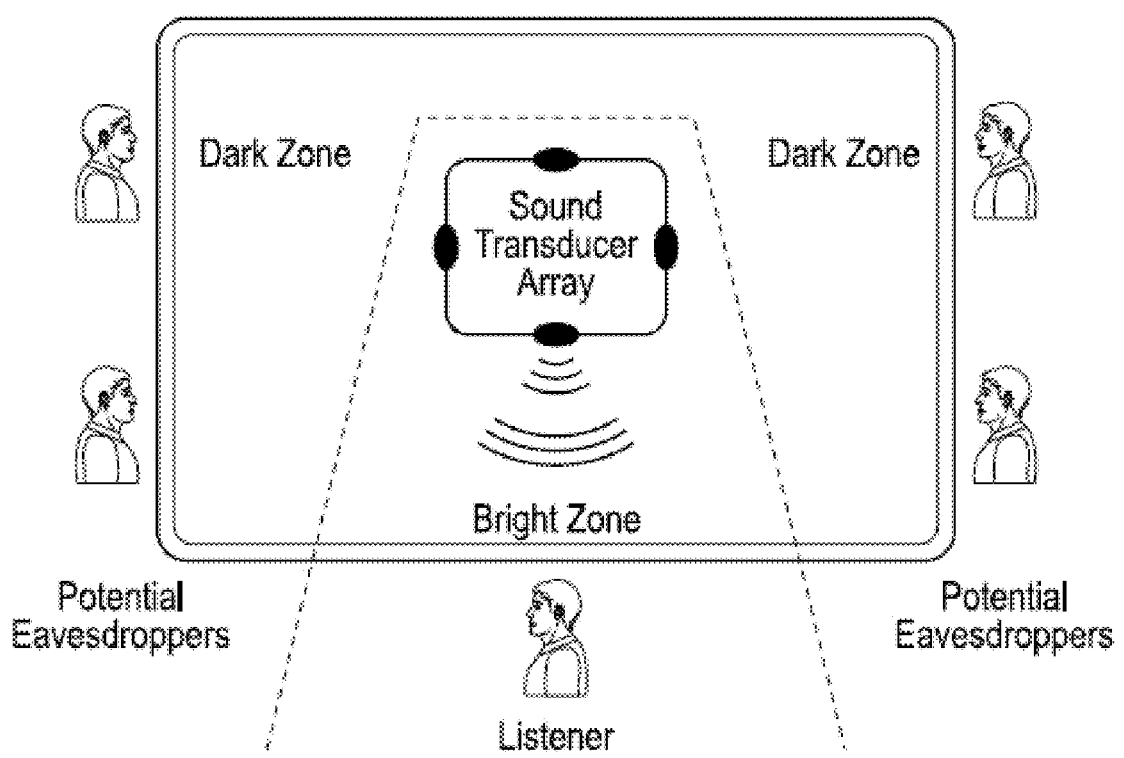
FIG. 3 illustrates an example of the array as utilized to create a privacy zone for voice communication.

FIG. 3 illustrates an example of the array as utilized to create a privacy zone for voice communication. As shown, a listener is in a "bright" zone and four (4) potential eavesdroppers are located in "dark" zones. The zones are illustrated on a physical space allowing individuals sitting around the physical space (e.g. a conference table) to visualize a pattern representing the "bright" zone and a pattern representing the "dark" zone or zones. An individual in the "bright" zone may hear the intended sound while an individual (or individuals) in the "dark" zone either hear a muted version of the sound in the bright zone, or hear a non-recognizable version of the sound in the bright zone. A non-recognizable version of the sound may be a masked version of the sound in the bright zone. Beamforming techniques or other spatial audio techniques may be applied in forming the bright and dark zones. Further explanation of these techniques may be found in U.S. Utility application Ser. No. 13/665,592, entitled "Systems, Methods, and Apparatus for Producing a Directional Sound Field" filed on Oct. 31, 2012.

Representations of a bright zone and dark zone may also be visually displayed when sound is emanating from speakers in a sound transducer array. In such an embodiment the listener illustrated may be in a voice communication call, and may be using the sound transducer array to block the potential eavesdroppers from listening in on the listener's conversation. For example, display of the bright and dark zone patterns may be on a surface table as further described herein.

Figure 6:
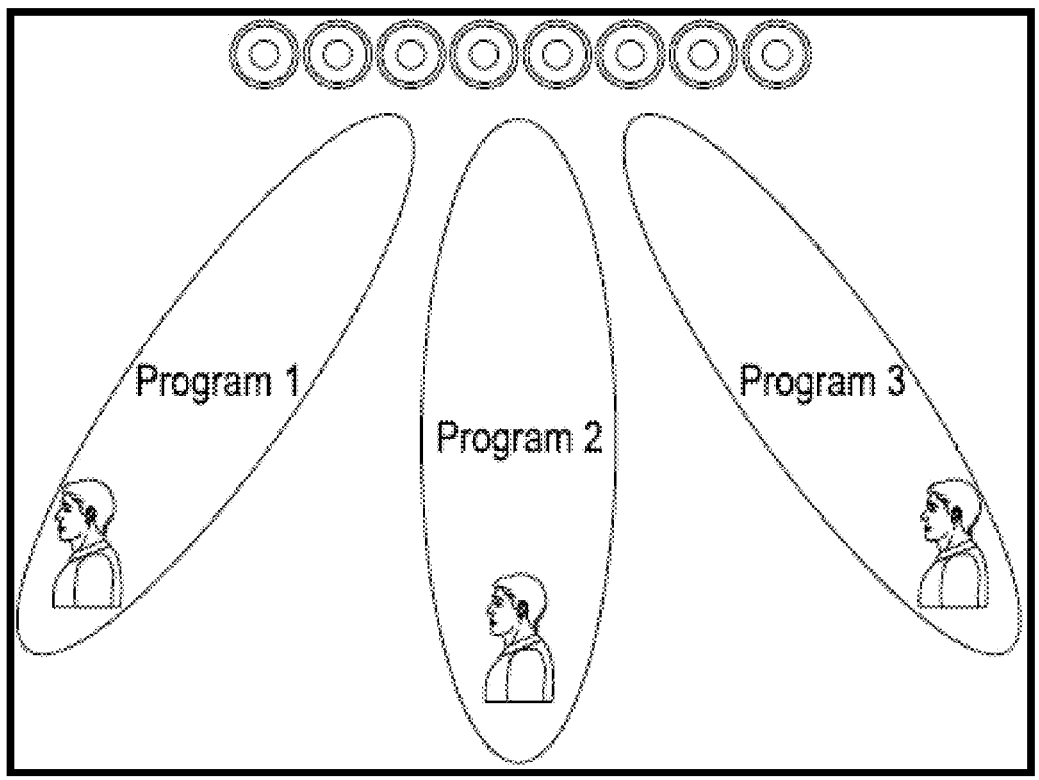
FIG. 6 illustrates an example of utilizing the array for delivering multiple audio programs simultaneously in different directions without interfering with each other.

A different variant of the privacy zone for voice communication is to use a similar technique as creating a privacy zone described above, but the listener and eavesdropper are all listening to different programs, for example, as shown in FIG. 6. In such a variant, the patterns illustrated on the physical space may either be a pattern representing a program. In a different configuration, the patterns illustrated may also represent a privacy zone for hearing the programs. For example, each person around the physical space may be listening to a different sound recording or sound stream (e.g. 3 radio stations). The bright zone and dark zones may be individualized for each person. One possible implementation, where there are three persons for example, is to overlay three privacy zones and display representations of each of the three privacy zones in the physical space. Thus, each person, in effect has their own privacy zone with respect to the other person.

Figure 4:
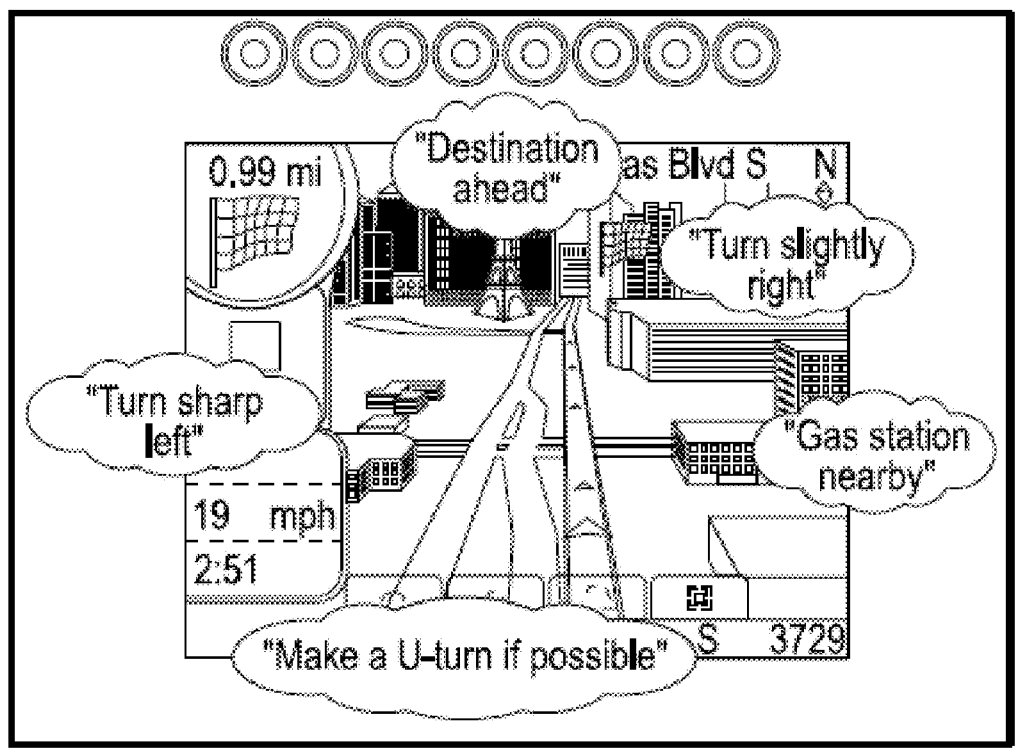
FIG. 4 illustrates an example of a spatialized vehicle navigation system using the array.

FIG. 4 illustrates an example of a spatialized vehicle navigation system using the array. In this example, sound for each turn-by-turn voice command may seem to originate from a direction towards which the listener should make a turn.

Figure 5:
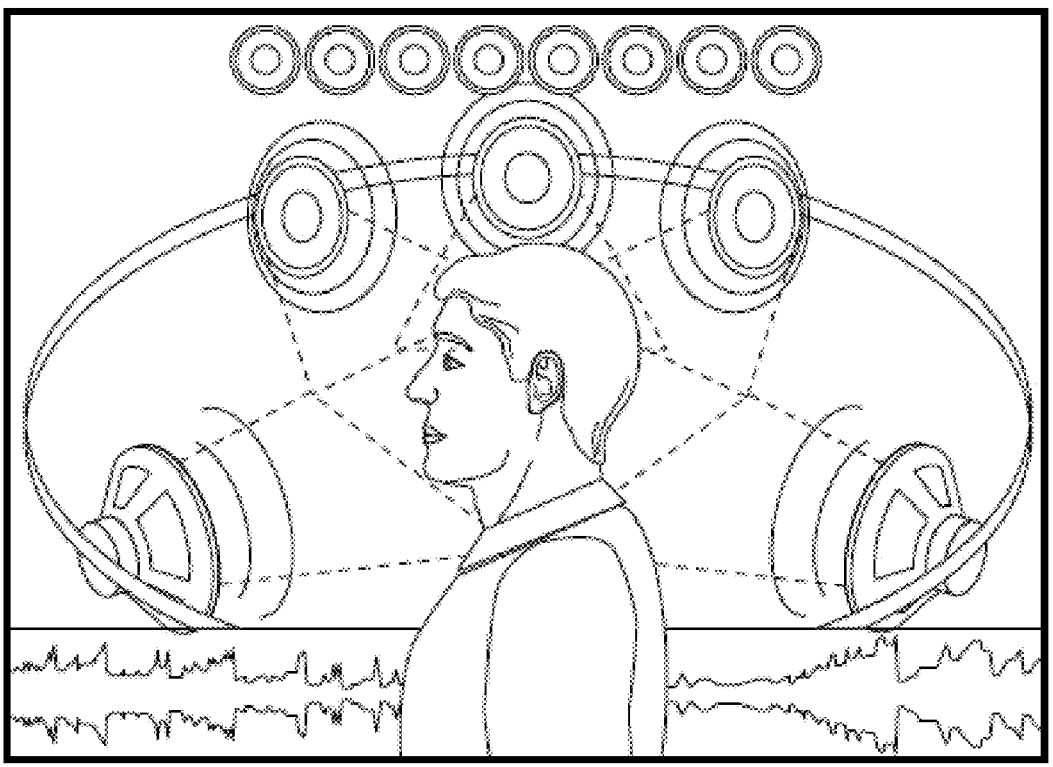
FIG. 5 illustrates an example of utilizing the array for a surround sound experience.

FIG. 5 illustrates an example of utilizing the array for a surround sound experience.

FIG. 6 illustrates an example of utilizing the array for delivering multiple audio programs simultaneously in different directions without interfering with each other.

The spatial processing of signals for the array to implement the above use examples may be provided by control software. While a user may interact with the control software using a traditional "keyboard and mouse" interface to configure and control sound field producing and pickup pattern adjustments, the traditional interface still only provides an abstract approach in controlling the sound field. Further, the interface needs to be in the same location where the sound occurs.

Figure 7:
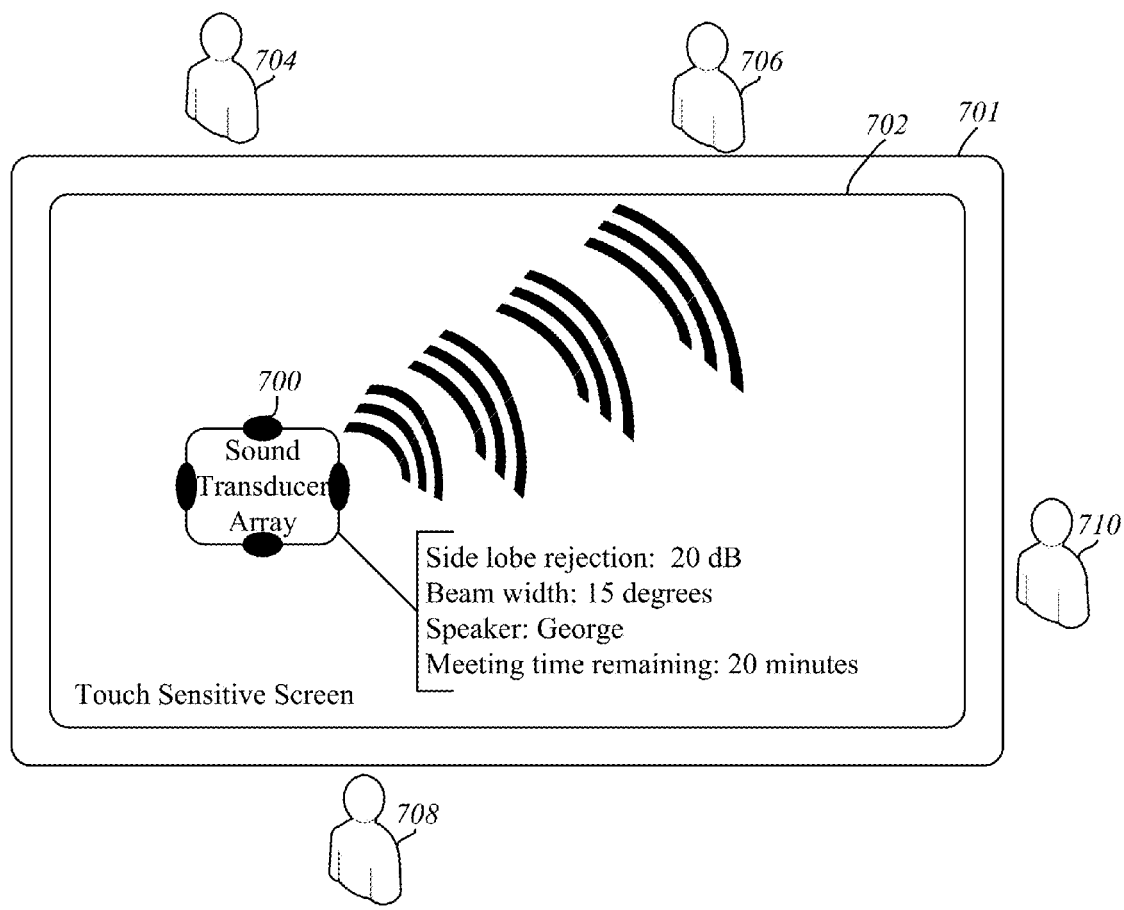
FIG. 7 illustrates an example of representing a sound field in a physical space, according to one embodiment.

FIG. 7 illustrates an example of representing a sound field in a physical space, according to one embodiment. In the system, a graphical representation of sound captured by a sound transducer array may be juxtaposed in the physical space of the sound field. The graphical representation may be in the form of sound projection patterns (e.g. one or more physical wave fields).

As shown, the system may include a sound transducer array 700 and a device 701. In some implementations, the device 701 may be part of a table. The sound transducer array 700 may include several microphones/speakers arranged in a manner to capture sound/audio from different directions. The microphones may be arranged linearly, in a circle or any other arrangements. The device 701 may include a touch sensitive screen 702. The touch sensitive screen 702 may be for displaying the graphical representation of the sound field of the captured sound in a physical space. Auxiliary information regarding the sound can also be displayed in text and charts around the tagged array. If something needs to be changed on the sound, a touch screen can provide some control that lets an individual (or user) modify the sound.

The sound transducer array 700 may communicate with the device 701 using at least one wireless communication link using a particular communication protocol. Examples of communication protocols include near-field communication (NFC), Wi-Fi, Bluetooth, ZigBee, Digital Living Network Alliance (DLNA), and Airplay.

Furthermore, FIG. 7 illustrates the device 701, with the touch sensitive screen 702, as part of a conference table that has four individuals 704-710 sitting around the table participating in a meeting/conference. As shown in FIG. 7, the sound transducer array 700 may be positioned on top of the screen 702 of the device 701.

From the sound transducer array 700, actual filter information on microphones and speakers are available. From this information, the sound projection pattern or microphone pickup pattern in a 3D space (in this case, 2D horizontal space contains the majority of information) can be calculated. This information may be transmitted to the surface table via wireless protocols like Bluetooth, Nearfield Communication, DLNA, etc. as indicated above. With this information, various computer graphical visualizations can be generated. The graphics in general may be 2D graphics matching the 2D sound pressures or exaggerated versions of it. The origin of the graphics may be anchored to the center of the sound transducer array 700 and may shift when it moves. In some implementations, ultrasonic/infrared/sonic pulses may be used to determine the position of the sound transducer array 700. In other implementations, the sound transducer array 700 may include a Near Field Communication (NFC) tag, which allows the device 701 to determine the position of the sound transducer array 700. As such, the representation (i.e. symbolization and representation) of sound field array may be aligned with the actual sound field in space.

Figure 8:
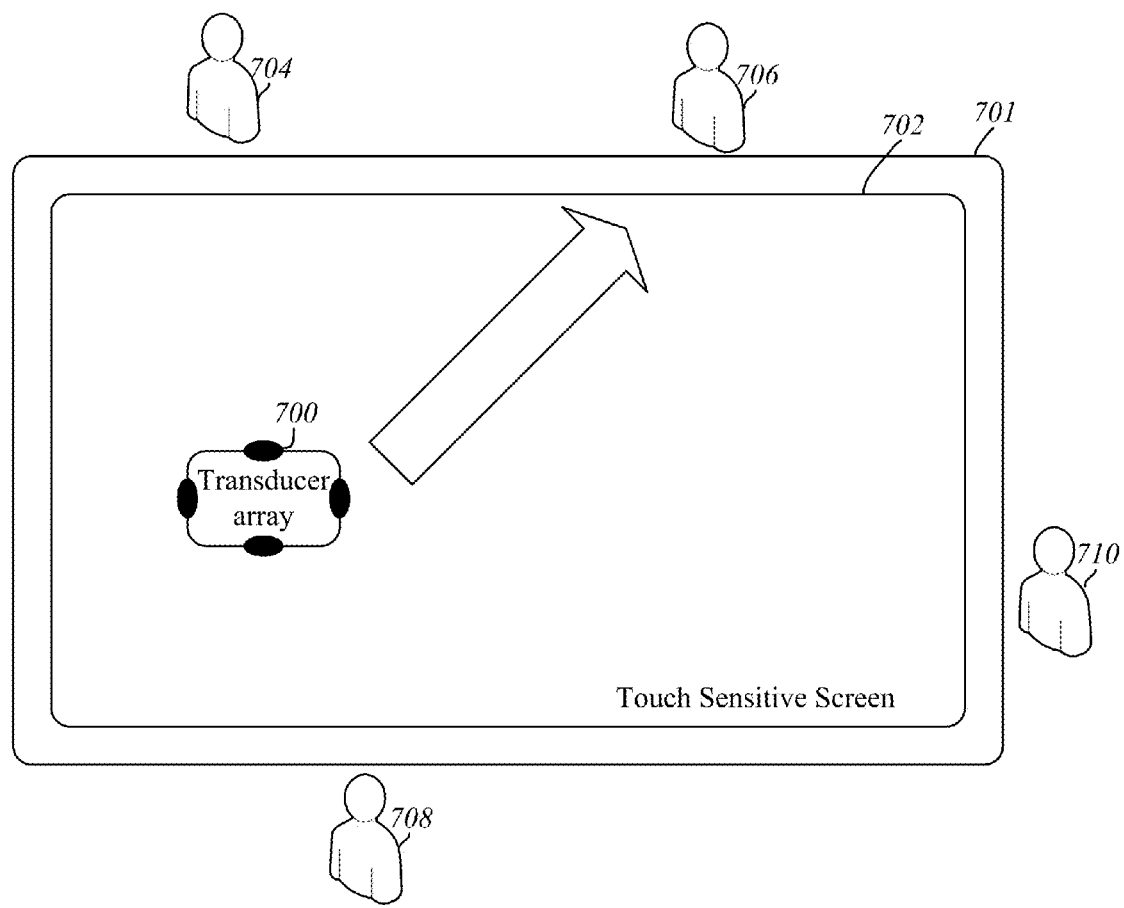
FIG. 8 illustrates an example of a sound field visualization system where the sound field is represented symbolically as an arrow.

FIG. 8 illustrates an example of a sound field visualization system where the sound field is represented symbolically as an arrow. The arrow may extend from the sound transducer array 700 to the originating location of the captured sound.

Figure 9:
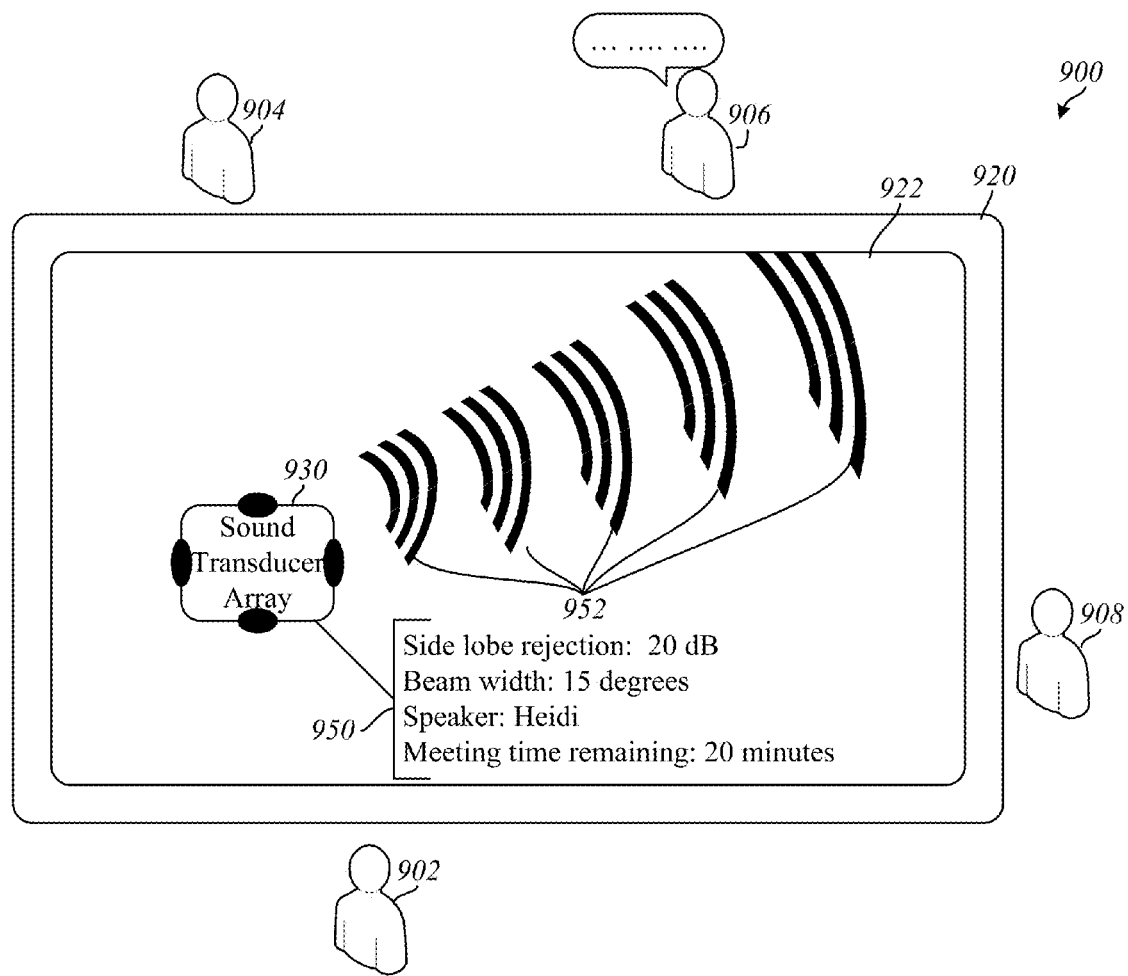
FIG. 9 illustrates an example of representing a sound field visualization image in a physical space showing a sound transducer array is not directed at the individual speaking, according to one embodiment.

FIG. 9 illustrates an example of representing a sound field visualization image in a physical space showing that a sound transducer array is not directed at the individual speaking, according to one embodiment.

A novel and unobvious system is described herein that allows an individual (or user) to directly "touch the sound" to provide for a more intuitive and direct approach in interacting with sound field producing and pickup patterns. In one aspect of the disclosed approach, a touch surface-enabled table 920, as illustrated in FIG. 9, may include a touch screen interface and other sensors on a touch screen display surface ("table surface") 922. Tagged objects, such as a sound transducer array ("array") 930, may be placed on top of and near the table 920. The example described in FIG. 9 includes four individuals 902, 904, 906, and 908 participating in a teleconference and located around the touch surface-enabled table 920, such as a conference table. One individual 906 may be speaking, with sound from that individual being captured by the array 930.

The array 930 may include several microphones/speakers arranged in a manner to capture/produce sound (or audio) from/to different directions. The microphones may be arranged linearly, in a circle or any other arrangements. Information and graphics may be displayed on the table 920 for these objects. For example, a graphical information element 950 may be displayed on the table surface 922 that describes parameters for the teleconference such as spatial processing parameters (illustrated as "Side lobe rejection: 20 dB" and "Beam width: 15 degrees"), an identification of the speaker (illustrated as "Speaker: Heidi"), and time information (illustrated as "Meeting time remaining: 20 minutes").

In addition, for tagged objects that are sound devices such as the array 930, graphical representations of sound radiation and/or microphone pickup patterns may be visualized near them. In some implementations, ultrasonic/infrared/sonic pulses are used to determine the position of the array 930. In other implementations, the array 930 may include a Near Field Communication (NFC) tag, which allows the table 920 to determine a position and relative orientation of the array 930. As such, a representation (i.e. symbolization and representation) of any sound projection patterns related to the array 930 may be aligned with an associated actual sound field in space. For example, a sound projection pattern (or field visualization image) 952 may be displayed on the table surface 922 for the representation of the sound field of the captured sound. The sound field visualization image 952 may provide visual confirmation that the array 930 is focused on the individual 906 speaking and/or capturing the sound. As may be seen in FIG. 9, the sound field visualization image 952 may visually show the participants that the array 930 is not—even though it should be—directed at the individual 906, who is speaking.

Figure 12:
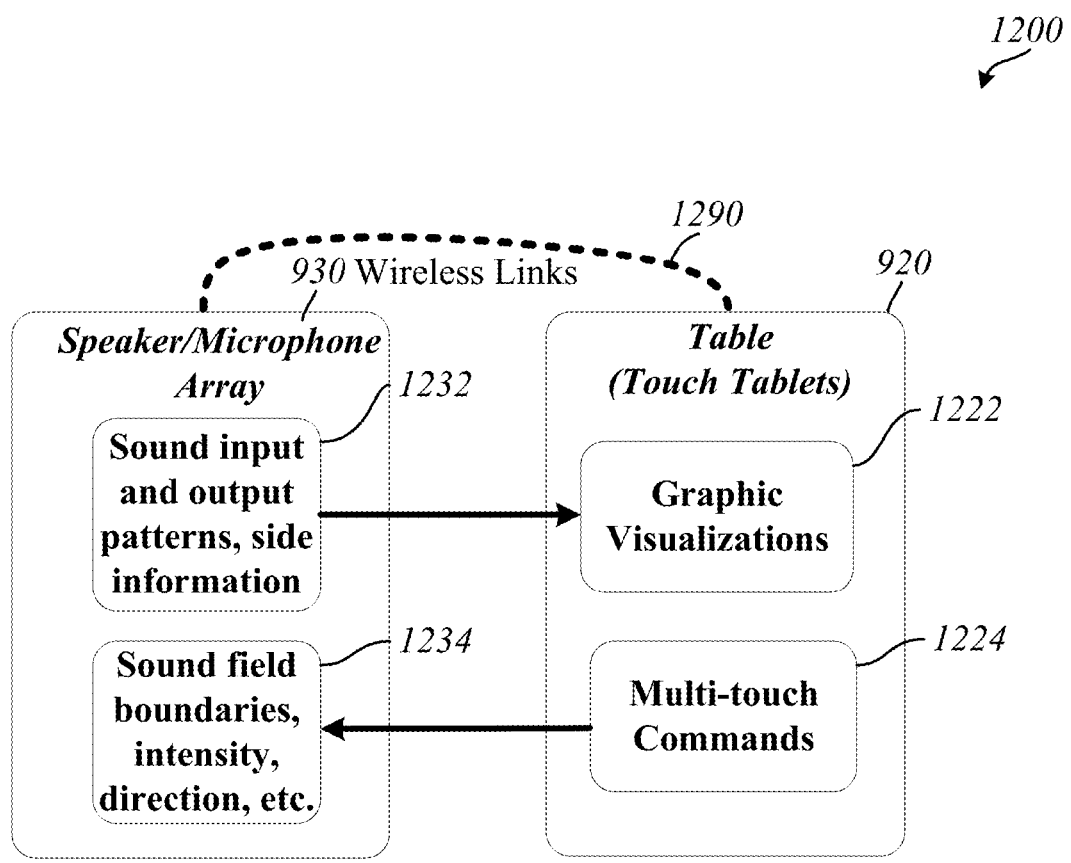
FIG. 12 illustrates a block diagram of sound field visualization and control system.

In one aspect of the disclosed approach, touch screen control software may be used to modify spatial processing characteristics of the array 930. The touch screen control software may be implemented as part of a sound field visualization and control system ("sound field system") 1200, an example of which is depicted in FIG. 12. In the sound field system 1200, the array 930 may communicate with the table 920 using any number of wireless communication links 1290 using various communication technologies.

From the array 930, actual filter information on microphones and speakers contained therein is available. From this information, a sound projection pattern or microphone pickup pattern in a three-dimensional (3D) space (in this case, a two-dimensional (2D) plane horizontal to the table surface 922 contains the majority of information) may be determined. This information may be transmitted to the surface table via wireless communication links 1290. While the table surface 922 displays the visual counterpart of a sound projection pattern's behavior (illustrated as "Graphic Visualizations" 1222), the table 920 may also function as a tangible interface with multi-touch and other command sensors (illustrated as "Multi-touch Commands" 1224).

According to one embodiment, a user interface may be displayed on the physical space to allow the individual (or user) to select a desired operation; the desired operation may comprise selecting the one or more sound projection patterns for application of a second operation thereto or creating one or more virtual groupings of the one or more sound projection patterns. The graphical representation may comprise an illustration of the one or more virtual groupings; where the illustration may comprise one or more virtual layers, wherein each of the one or more virtual groupings corresponds to at least one of the one or more virtual layers.

Individuals (or users) may directly and intuitively adjust parameters related to the visualized sound projection patterns by interacting with the touch surface while receiving visual feedback in real-time or near real-time. Possible interaction modalities may include an individual exercising one or more commands on the touch surface. The commands may be used to manipulate the graphical representation of one or more sound projection patterns (e.g. one or more physical wave fields) associated with a sound transducer array. The command may be in the form of text, communication from keyboards, mice, buttons, bars, menus, or their counterparts in software. The command may also be a gesture which can be adjusted based on visual feedback received from the change of the display on the touch surface. The gesture may be performed with an individual's fingers instead of a computer mouse. Gestures can include, but are not limited to, selecting a sound projection pattern by multiple (e.g. double or triple) tapping, drawing a circle two or more times around the pattern, sending different beams to different virtual layers, hiding one or more beams temporarily, selecting one or more beams, grouping multiple sound projection patterns together and manipulating them in a group manner and/or application of an additional graphic effect once an beam or grouping is selected so the beam or grouping may be modulated and emphasized.

Returning to the example in FIG. 9, the graphic visualizations 1222 may be generated with information received from the array 930 (illustrated as "Sound input and output patterns, side information" 1232). The graphics in general may include a 2D graphic matching the 2D sound pressures, or exaggerated versions of it. In the example illustrated in FIG. 9, the sound field visualization image 952 may visually represent the 2D sound field for the captured sound. In one aspect of the disclosed approach, origins of the graphics may be anchored to a center of the array 930 and may shift if the array 930 is moved.

Figure 10:
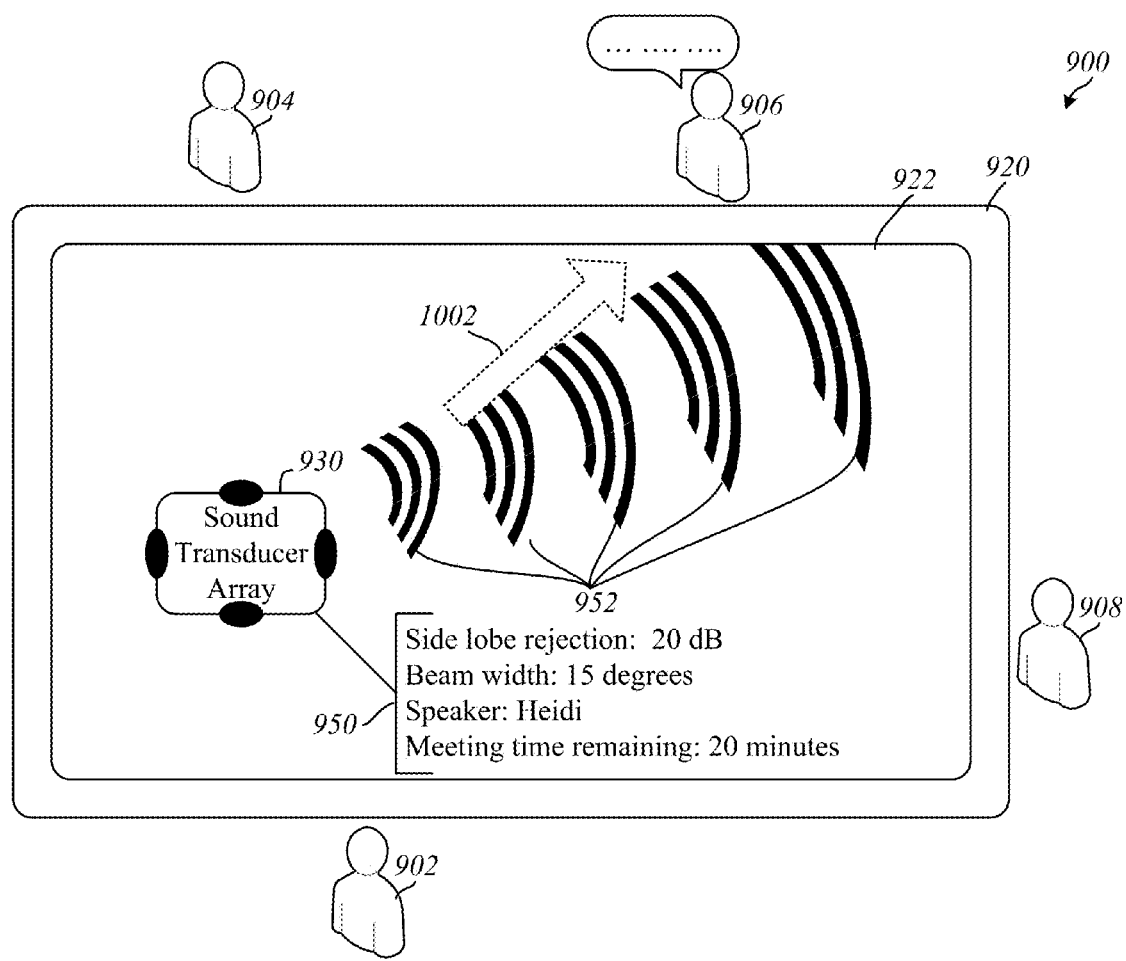
FIG. 10 illustrates the touch surface-enabled table of FIG. 9 showing a dragging command illustrated as an arrow on the table.
Figure 11:
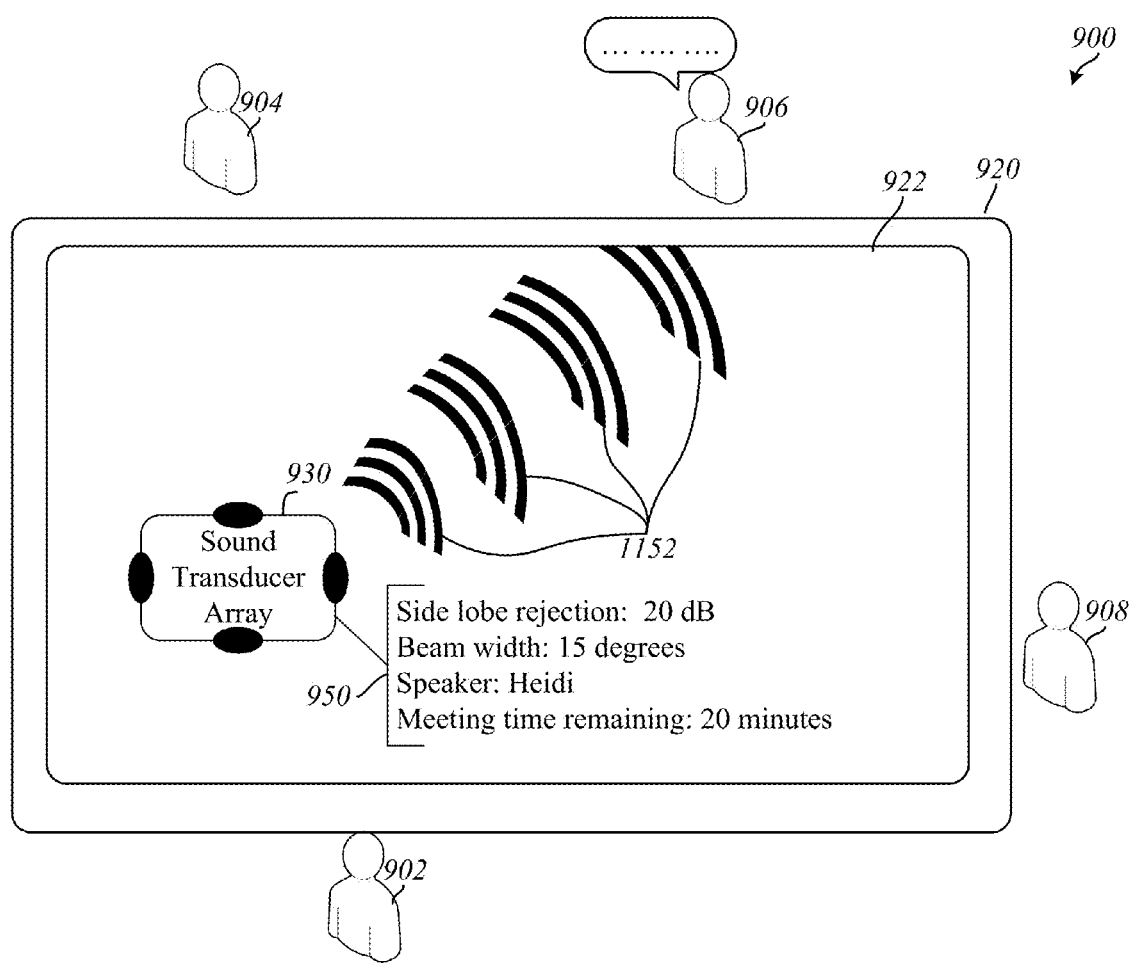
FIG. 11 illustrates an adjusted sound field of the array, visualized as an updated sound field visualization image, which shows the participants that the array is now properly directed to receive sound from the individual.

As shown in FIG. 9, the sound field visualization image 952 visually shows the participants that the array 930 is not—even though it should be—directed at the individual 906, who is speaking, any one of the participants may perform a gesture to re-direct the sound field of the array 930 towards the individual 906. Control information, such as that based on the multi-touch commands 1224 received from the table surface 922, may be used to control the array 930 by changing characteristics of the array 930 (illustrated as "Sound field boundaries, intensity, direction, etc." 1234). Thus, the individual 906 may perform a dragging command on the table surface 922, illustrated in FIG. 10 as an arrow 1002, and redirect the array 930. FIG. 11 illustrates an adjusted sound field of the array 930, visualized as an updated sound field visualization image 1152, which shows the participants that the array 930 is now properly directed to receive sound from the individual 906. Thus, a user may literally "touch the sound" and perform such operations as redirect beam patterns, draw new beam patterns, adjust parameter values, etc., and see visual change as sound field is being manipulated.

Figure 13:
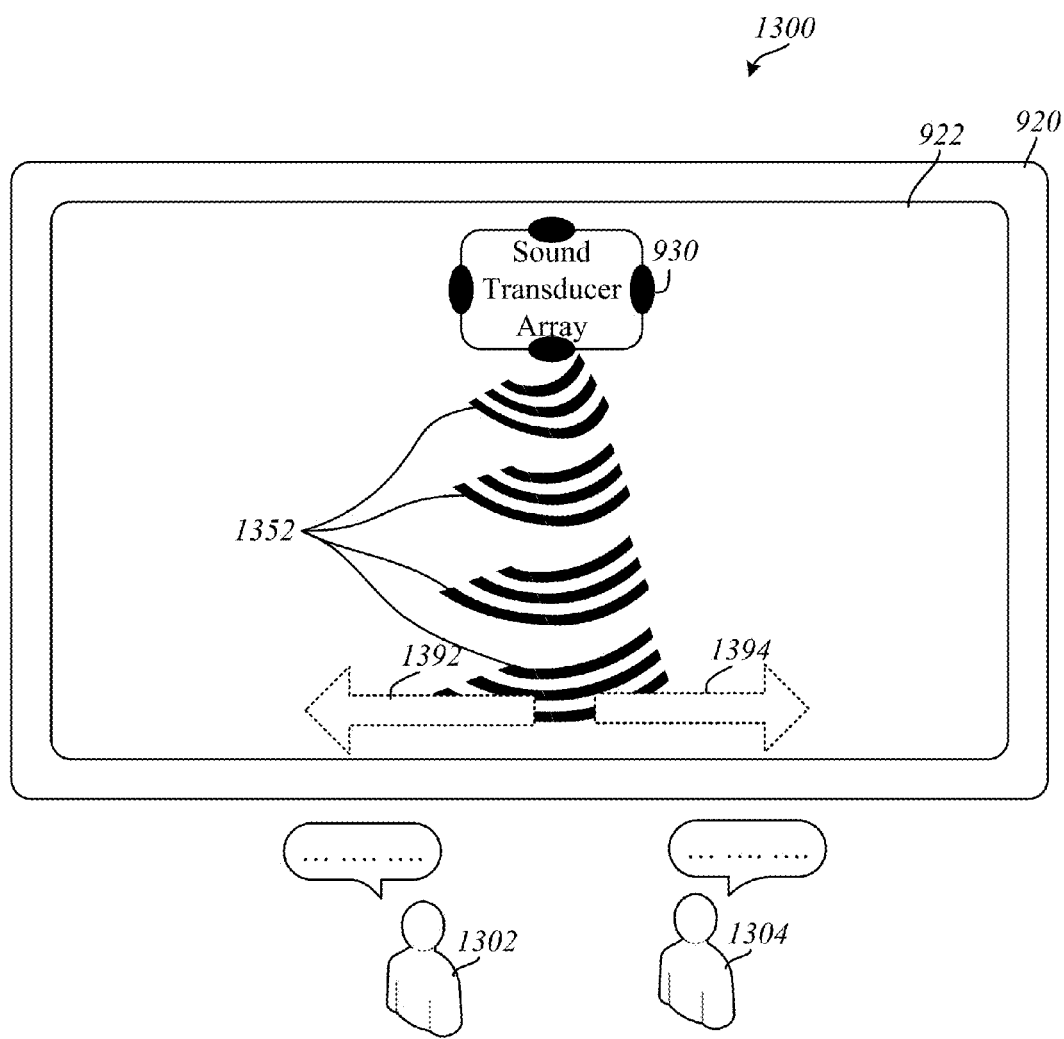
FIG. 13 illustrates a teleconference system or a sound stage scenario where a user may need to control pickup of sound from two adjacent talkers separated from each other at a distance.

In another example, such as in a teleconference system or a sound stage scenario 1300 as illustrated in FIG. 13, a user may need to control pick up of sound from two adjacent talkers 1302, 1304 separated from each other at a distance. Because the distance to cover between the adjacent talkers 1302, 1304 is wide, a pickup beam from the array 930 may need to be adjusted so that the pickup beam is wide enough to cover the talkers 1302, 1304, but not so wide as to pick up spurious sound such as background noise. By being able to visually see the pickup beam, as illustrated by a sound field visualization image 1352 displayed on the surface 922, the participants may see that the pickup beam from the array 930 is too narrow. That is, a user may see that, as configured, the pickup beam from the array 930 is not wide enough. In this example, such as through the use of two hands, the user may gesture to the table 920, as illustrated by arrows 1392, 1394, a "zooming" of the pickup beam from the array 930. The table 920 may then communicate to the array 930 that the user wants a wider beam. The array 930 may appropriately adjust its internal filters, and the table 920 may visualize a wider beam on the table surface 922, all in real-time or near real-time.

Figure 14:
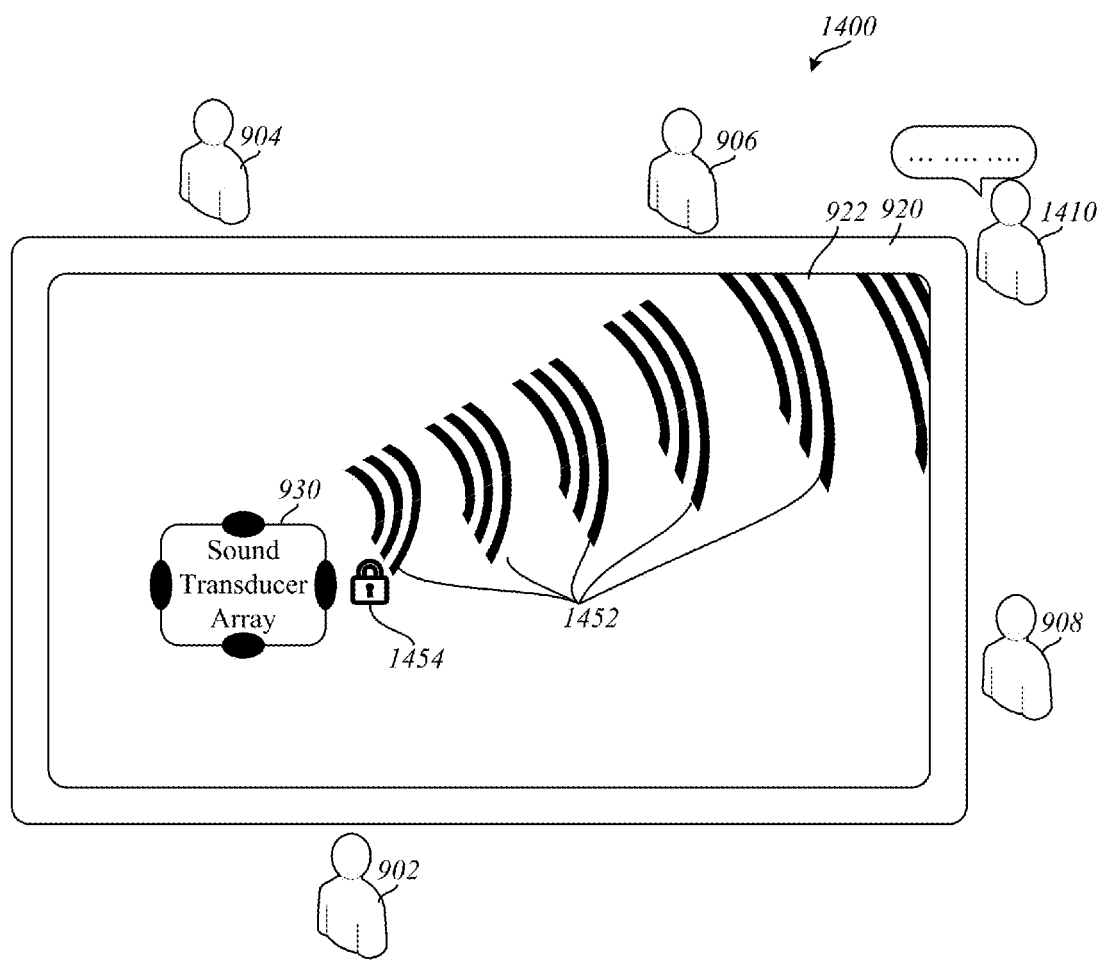
FIG. 14 illustrates the touch surface-enabled table of FIG. 8 having a very important talker ("VIP"), whose voice is a major focus of a pickup beam from the array.

Normally, the array 930 may follow whoever is speaking such that the pickup beam may automatically switch to be directed at whoever is speaking Referring to the example of FIG. 9, as further modified in FIG. 14, there may exist a very important talker ("VIP") 1410, whose voice is a major focus of a pickup beam from the array 930. The system should not miss anything that the VIP 1410 is saying, and may sacrifice losing some content from other individuals such as the individuals 902, 904, 906, and 908. In this example, by a gesture such as triple-tapping or drawing a circle two times in a direction of the VIP 1410, the pickup beam from the array 930 may be locked to follow the VIP 1410, and the array 930 may now only record the VIP 1410. A sound field visualization image 1452 may be displayed on the table surface 922 to show the participants a current direction of the pickup beam from the array 930, and a lock icon 1454, as well as other visual indicators, may also appear on the table surface 922 to indicate that the pickup beam is in a locked mode. A user may use another gesture to unlock the pickup beam.

The various aspects described herein may also be extended to tablet or other touch-screen devices, where arrays may also be tagged and represented on the tablet devices. For example, a number of participants may each have a tablet device with an associated sound transducer array that may be integrated as part of the system along with the table 920.

Having provided an overview of the various devices and components of a system for representing a sound field in a physical space, detailed description of how these devices are used in such a system is described below.

Figure 15:
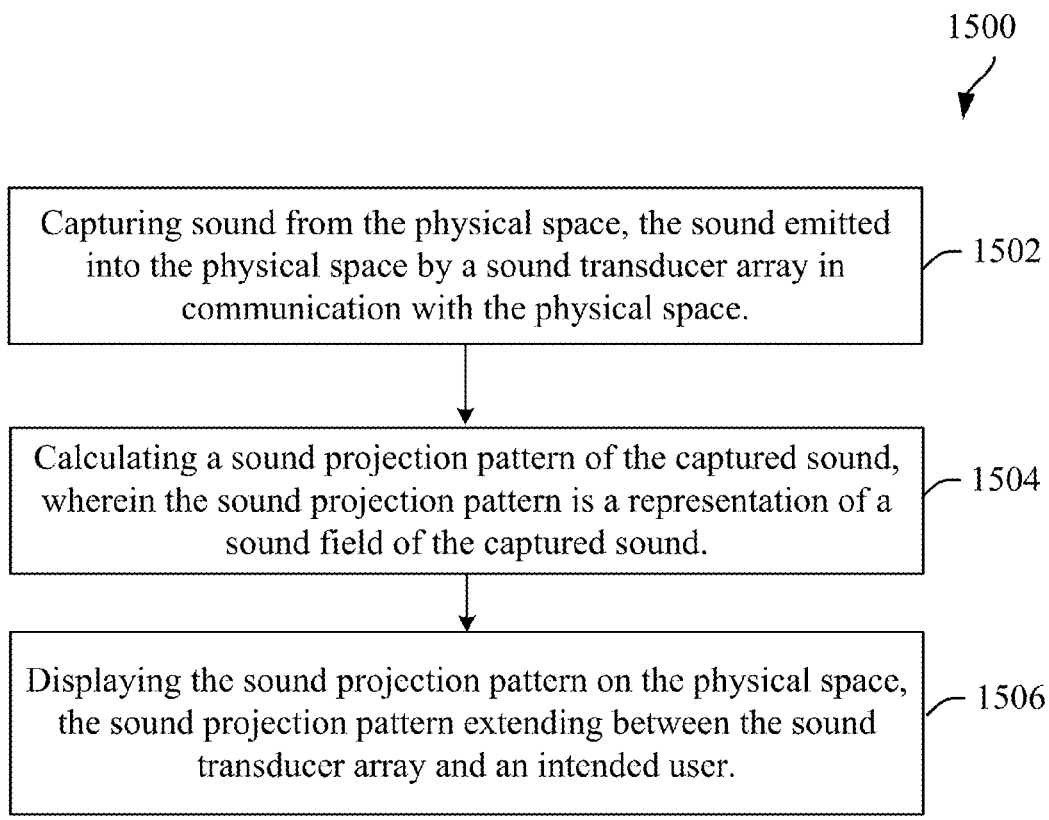
FIG. 15 illustrates a flow chart of an overview method for representing a sound field in a physical space, according to one embodiment.

FIG. 15 illustrates a flow chart of an overview method for representing a sound field in a physical space, according to one embodiment. As shown in FIG. 15, sound may be captured from the physical space where the sound is emitted into the physical space by a sound transducer array in communication with the physical space 1502. The sound may be captured in real-time or near real-time and may include subsonic sounds, ultrasonic sounds, infrared sounds, and radio frequency sounds. The physical space may be, for example, a display screen, a touch sensitive screen or a tablet. A sound projection pattern of the captured sound may then be calculated wherein the sound projection pattern is a representation of a sound field of the captured sound 1504. The sound projection pattern may be in the form of beam patterns or symbols, for example an arrow. After the sound projection pattern has been calculated, the sound projection pattern may be displayed in real-time or near real-time on the physical space and extend between the sound transducer array and an intended user 1506.

According to one embodiment, once the sound has been captured, the captured sound may be processed to identify an originating location of the captured sound. The intended user may be at the originating location of the captured sound.

According to one embodiment, the sound transducer array may comprise a combined microphone and speaker array. A microphone beam may be captured on the sound transducer array and displayed in the physical space in a first color and a speaker beam may be transmitted from the sound transducer array and displayed in the physical space in a second color where the first color is different than the second color. A color heat map may be applied to the microphone beam where a main lobe of the color heat map represents a strong signal region and color changes in the color heat map represent weaker signal regions.

According to another embodiment, the sound transducer array may comprise a separate microphone array and a separate speaker array. The microphone array may capture a microphone beam which may be displayed in the physical space in a first color and the speaker array may transmit a speaker beam that is displayed in the physical space as a second color where the first color is different than the second color. A color heat map may be applied to the microphone beam where a main lobe of the color heat map represents a strong signal region and color changes in the color heat map represent weaker signal regions.

Figure 16:
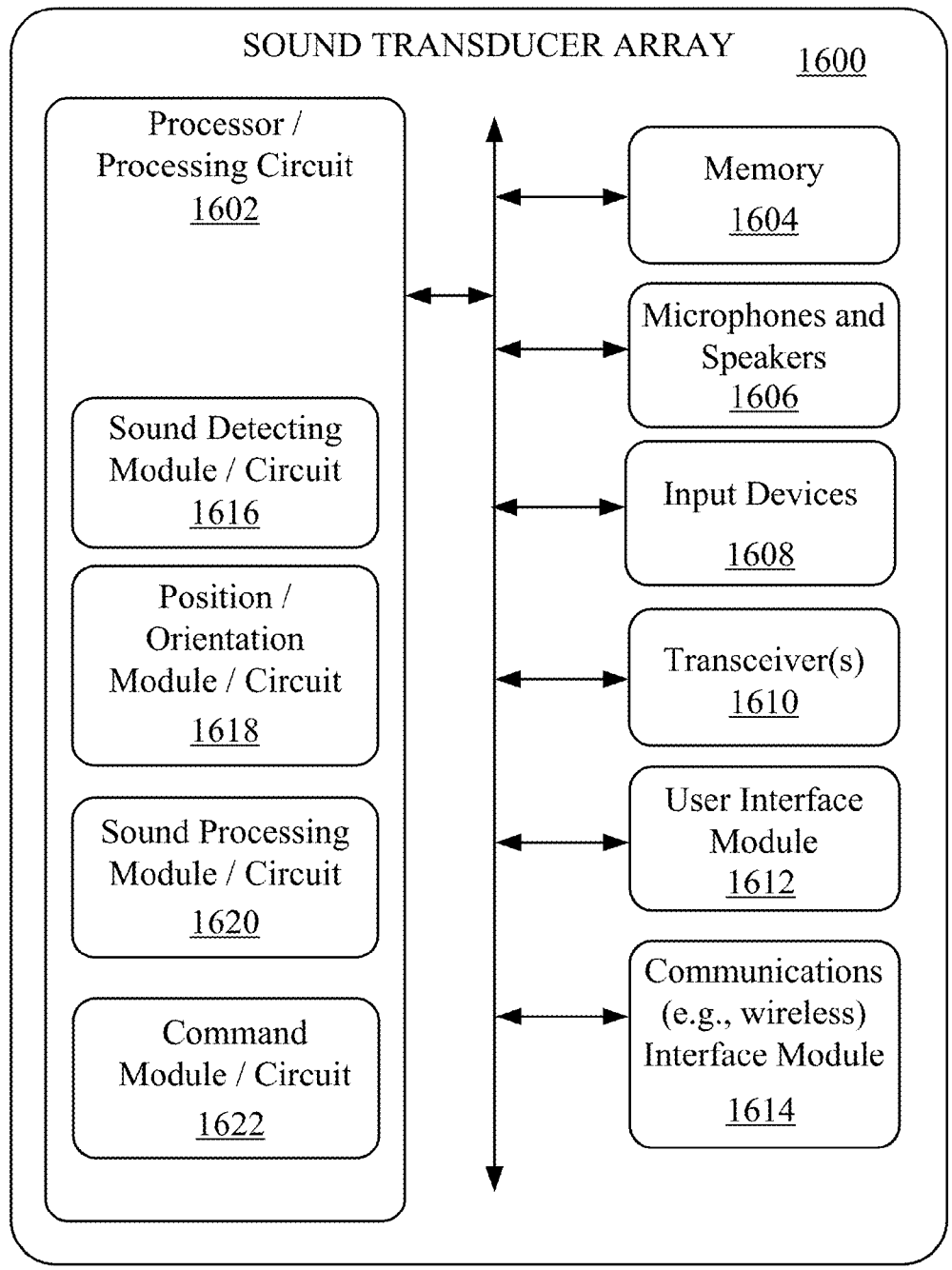
FIG. 16 illustrates an example of a sound transducer array that some implementations may use.

FIG. 16 illustrates an example of a sound transducer array that some implementations may use. As shown in FIG. 16, the sound transducer array 1600 may include at least one processor/processing circuit 1602, a memory 1604, a plurality of microphones and speakers 1606, several input devices 1608, at least one transceiver 1610, at least one user interface module 1612, and at least one communications interface module 1614.

The microphones and speakers 1606 may be used to capture sound and/or voice and transmit a speaker beam that is displayed in the physical space. The input devices 1608 may allow a user to literally "touch the sound" and perform such operations as redirect beam patterns, draw new beam patterns, adjust parameter values, etc., and see visual change as sound field is being manipulated The transceiver 1610 may allow the sound transducer array to transmit and receive wireless signals from other devices (e.g., phone, computer, tablet, sound transducer array). The sound transducer array may include multiple transceivers, which allows the sound transducer array to communicate (e.g., wirelessly) with different devices using different communications links and different communication protocols. In some implementations, the user interface module 1612 provides an interface between the microphones 1606, input devices 1608 and the processor/processing circuit 1602. The user interface module 1612 may include several user interface modules (e.g., a module for each component). In some implementations, the communications interface module 1614 provides an interface between the transceiver 1610 and the processor/processing circuit 1602. The communications interface module 1614 may include several interface modules (e.g., a module for each transceiver).

As shown in FIG. 16, the processor/processing circuit 1602 may include a sound detecting module/circuit 1616, position/orientation module/circuit 1618, a sound processing module/circuit 1620, and a command module/circuit 1622.

The sound detecting module/circuit 1616 may be for detecting and capturing sound. In some implementations, the sound detecting module/circuit 1616 may capture sound from the microphones 1606. The position/orientation module/circuit 1618 may be for determining the position and/or orientation of the sound transducer array 1600 in some implementations. The sound processing module/circuit 1620 may be for processing sound captured by the microphones 1606, calculating a sound projection pattern of the captured sound (i.e. a graphical representation of one or more physical wave fields) and displaying the graphical representation on the physical space. The command module/circuit 1622 may be for processing control information based on multi-touch commands (or gestures) to re-direct the sound field of the array. The processing of sound may include extracting individual sound from the captured sound. The processing of sound may also include identifying the identity of speakers in some implementations.

Figure 17:
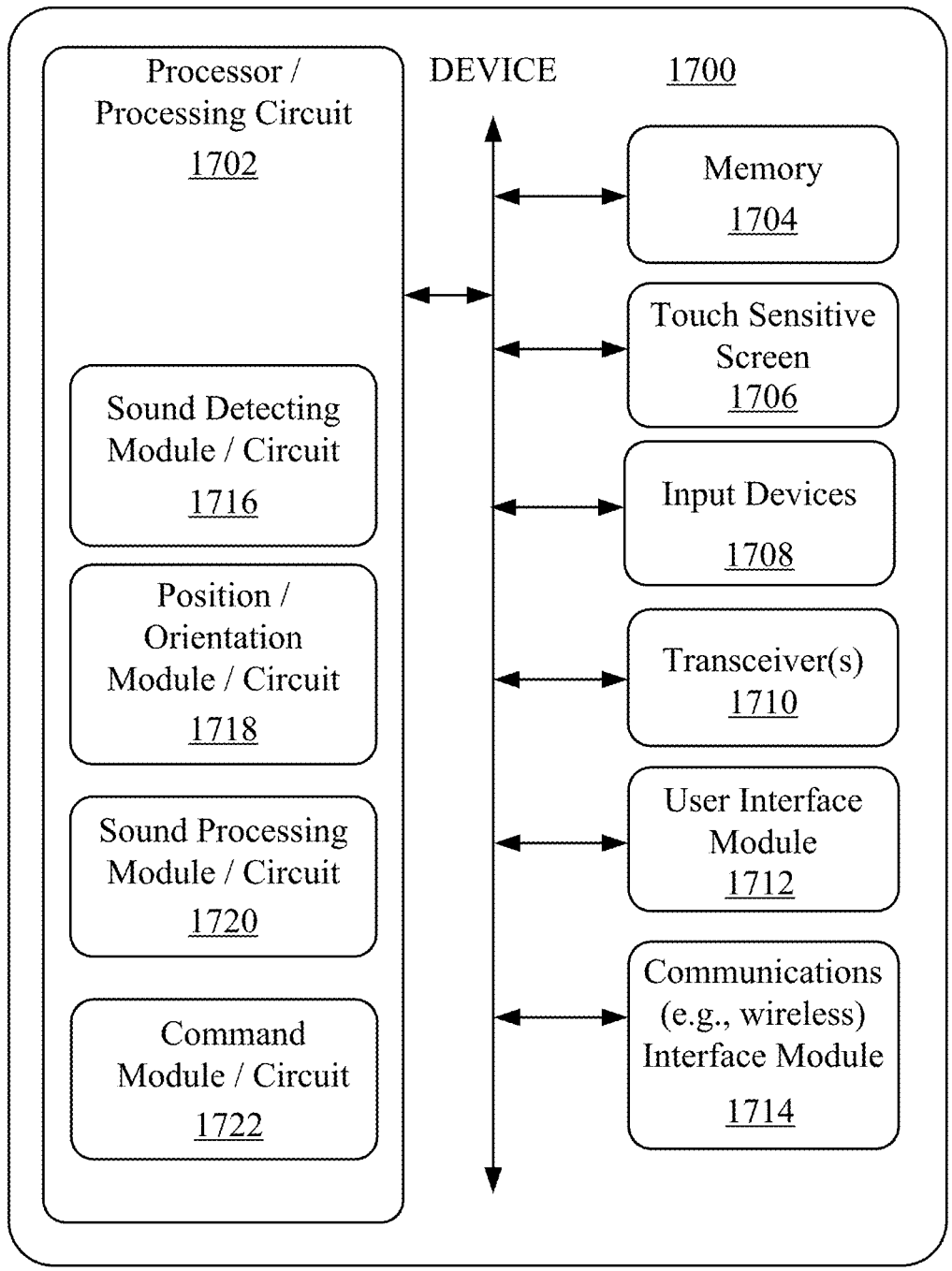
FIG. 17 illustrates an example of a device that some implementations may use.

FIG. 17 illustrates an example of a device that some implementations may use. As shown in FIG. 17, the device 1700 may include at least one processor/processing circuit 1702, a memory 1704, a touch sensitive screen 1706, several input devices 1708, at least one transceiver 1710, at least one user interface module 1712, and at least one communications interface module 1714.

The touch sensitive screen 1706 may be used to display a graphical representation of a sound field in a physical space. The touch sensitive screen 1706 may also be used to receive input from one or more users. The input devices 1708 allow a user to input data and/or provide control of the device. The transceiver 1710 allows the device to transmit and receive wireless signals from other devices (e.g., phone, computer, tablet, sound transducer array). The device may include multiple transceivers, which allows the sound transducer array to communicate (e.g., wirelessly) with different devices using different communications links and different communication protocols. In some implementations, the user interface module 1712 provides an interface between the touch sensitive screen 1706, input devices 1708 and the processor/processing circuit 1702. The user interface module 1712 may include several user interface modules (e.g., a module for each component). In some implementations, the communications interface module 1714 provides an interface between the transceiver 1710 and the processor/processing circuit 1702. The communications interface module 1714 may include several interface modules (e.g., a module for each transceiver).

As shown in FIG. 17, the processor/processing circuit 1702 may include a sound detecting module/circuit 1716 for interfacing with a sound transducer array, position/orientation module/circuit 1718 for determining the position of the sound transducer array, a sound processing module/circuit 1720, and a command module/circuit 1722.

The sound detecting module/circuit 1716 may be for interfacing with the sound transducer array. The position/orientation module/circuit 1718 may be for determining the position and/or orientation of the sound transducer array in some implementations. The sound processing module/circuit 1720 may be for processing sound captured by microphones in some implementations. The microphones may be microphones from a sound transducer array coupled to device. The processing of sound may include extracting individual sound from the captured sound. The processing of sound may also include identifying the identity of speakers in some implementations. The command module/circuit 1722 may be for processing control information based on multi-touch gestures to re-direct the sound field of the array.

Figure 18:
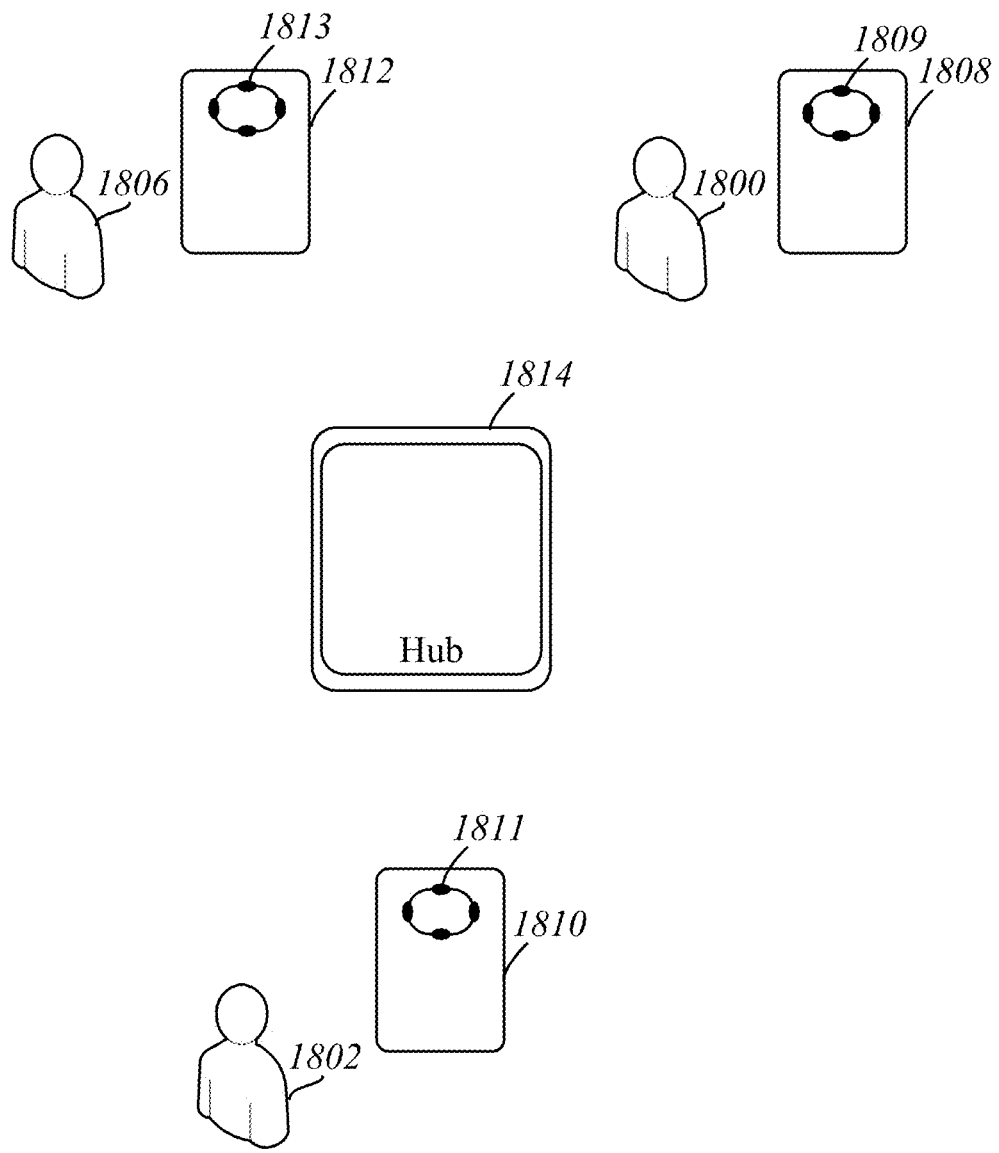
FIG. 18 illustrates a system for representing and controlling a sound field in a physical space utilizing one or more tablets, according to one embodiment.

FIG. 18 illustrates a system for representing and controlling a sound field in a physical space utilizing one or more tablets, according to one embodiment. As shown in FIG. 18, three individuals 1800-1806 may each have a tablet 1808-1812 that can communicate directly with each other or with a hub 1814. Each tablet may have its own sound transducer array (i.e. microphones and speakers) 1809-1813 that may be located internally within each tablet or externally on each tablet.

Figure 19A:
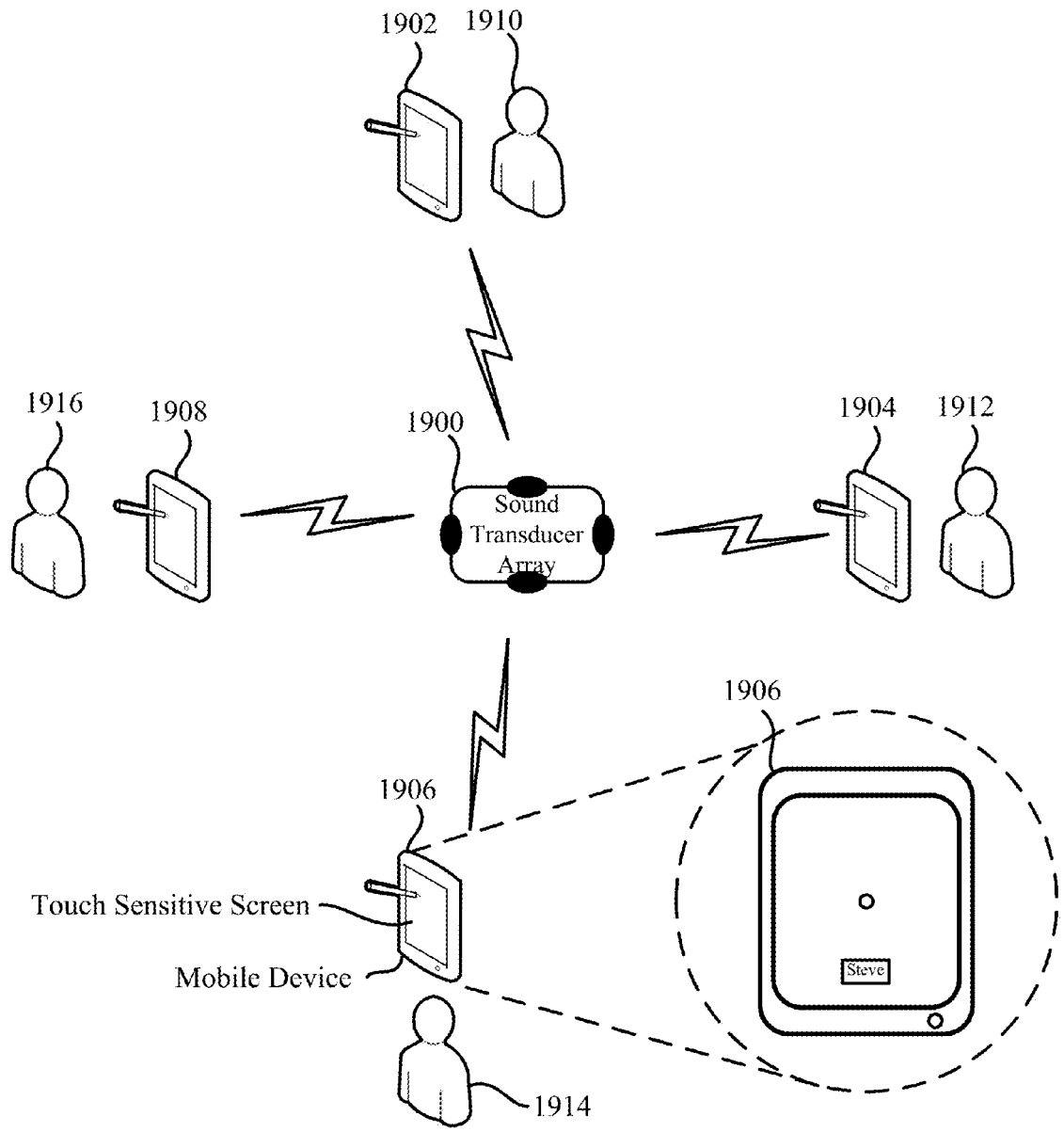
FIG. 19A illustrates a system that includes a sound transducer array and several devices.

FIG. 19A illustrates another configuration that may be implemented using additional devices. As shown in FIG. 19A, a sound transducer array 1900 is in communication with several mobile devices 1902-1908 (e.g., handset, tablet). Each of these mobile devices may be associated with a respective user/person 1910-1916. A mobile device may be a handset, a tablet, a phone, a smart phone, a portable electronic device, an electronic notepad, and/or a personal digital assistant (PDA). The mobile device may be able to communicate with other devices via a cellular network and/or other communication networks.

The mobile devices 1902-1908 may allow a user to "check in" and/or register with the sound transducer array 1900. (e.g., check in using NFC by tapping the mobile device near the microphone array 1900). However, different implementations may "check-in" and/or register with the sound transducer array 1900 differently. For example, a mobile device may use another communication protocol or communication link (e.g., Bluetooth, WiFi) to communicate with the sound transducer array 1900. Once the user/mobile device is "checked-in" or is registered, the mobile device may be tracked by the sound transducer array using ultrasonic/infrared/sonic pulses (or other known tags), which allows the sound transducer array 1900 to continuously know the position/location of the mobile device, which consequently means the sound transducer array 1900 knows the position/location of the user associated with the mobile device being tracked.

Each mobile device 1902-1908 may provide a graphical user interface on its respective screen that allows a user to specify the position/location of the user and/or device (e.g., tablet) relative to the sound transducer array 1900. That is, a user may indicate on the mobile device's screen the user's position which is then transmitted (e.g., via Bluetooth, WiFi) to the sound transducer array 1900 and/or another device (e.g., device 1001). The graphical user interface on the screen of the mobile device (e.g., mobile devices 1902-1908) may also provide/display text (e.g., transcribed captured voice). Such text may be provided/transmitted from the sound transducer array 1900 and/or another device in communication with the sound transducer array 1900.

The sound transducer array 1900 may be located on a table (not shown) or a touch sensitive screen (not shown) of a device integrated on a table. Similarly, the mobile devices 1902-1908 may be positioned on the table or a touch sensitive screen of a device integrated on a table.

Figure 19B:
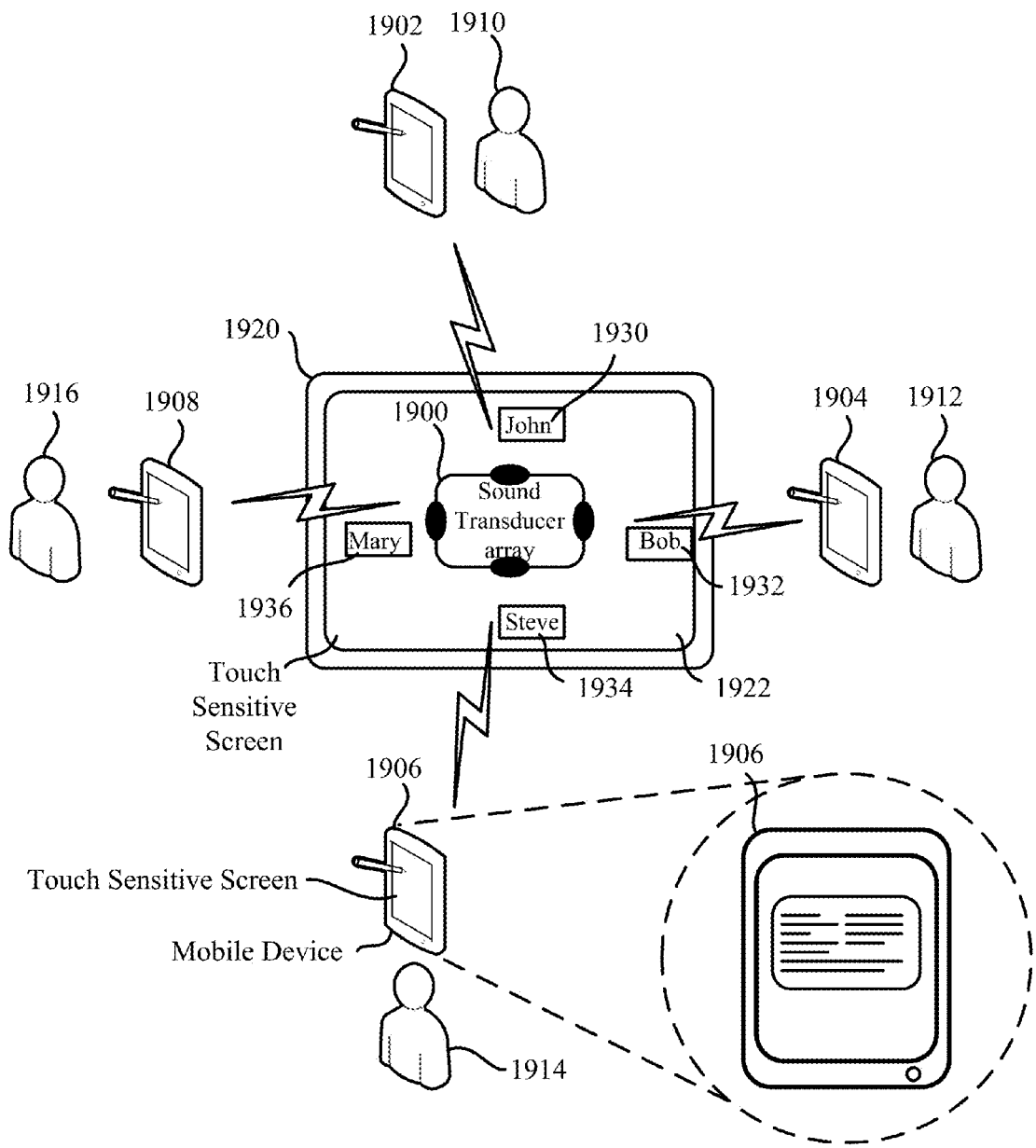
FIG. 19B illustrates another system that includes a sound transducer array and several devices.

FIG. 19B illustrates another configuration that may be implemented using a different device. FIG. 19B is similar to FIG. 19A except that the sound transducer array 1900 is located on a touch sensitive screen 1922 of a device 1920 and the position of the users is specified on the graphical user interface of the touch sensitive screen 1922 of the device 1920. As shown in FIG. 19B, the mobile devices 1902-1908 (e.g., handset, tablet) are in communication (e.g., using Bluetooth, WiFi) with the sound transducer array 1900 and/or device 1920.

As further shown in FIG. 19B, users specify their positions relative to the sound transducer array 1900 by specifying the position/location of graphical user interface elements. As shown in FIG. 19B, there are four graphical user interface elements 1930-1936 displayed on the graphical user interface shown in the screen 1922. Each graphical user interface element 1930-1936 may be associated with a particular user and/or mobile device. The graphical user interface element may include a text or image (e.g., ID, name, picture) identifying the user that the user interface element is associated with. Different implementations may present the graphical user interface elements differently. In some implementations, a graphical user interface element is presented with the user taps the screen and/or logs in. In some implementations, the graphical user interface element may be presented when the user "check-in" and/or registers with the sound transducer array 1900 and/or device 1920 using one of the exemplary methods described above in FIG. 19A (e.g., checking in using NFC by tapping the sound transducer array 1900 and/or device 1920). Since the mobile devices 1902-1908 are in communication with the sound transducer array 1900 and/or device 1920, the mobile devices 1902-1908 may receive data from either or both the sound transducer array 1900 and device 1920. Such data may be presented/displayed on the screen of the mobile devices 1902-1908. Examples of data include transcribed text of captured voice in some implementations.

Figure 19C:
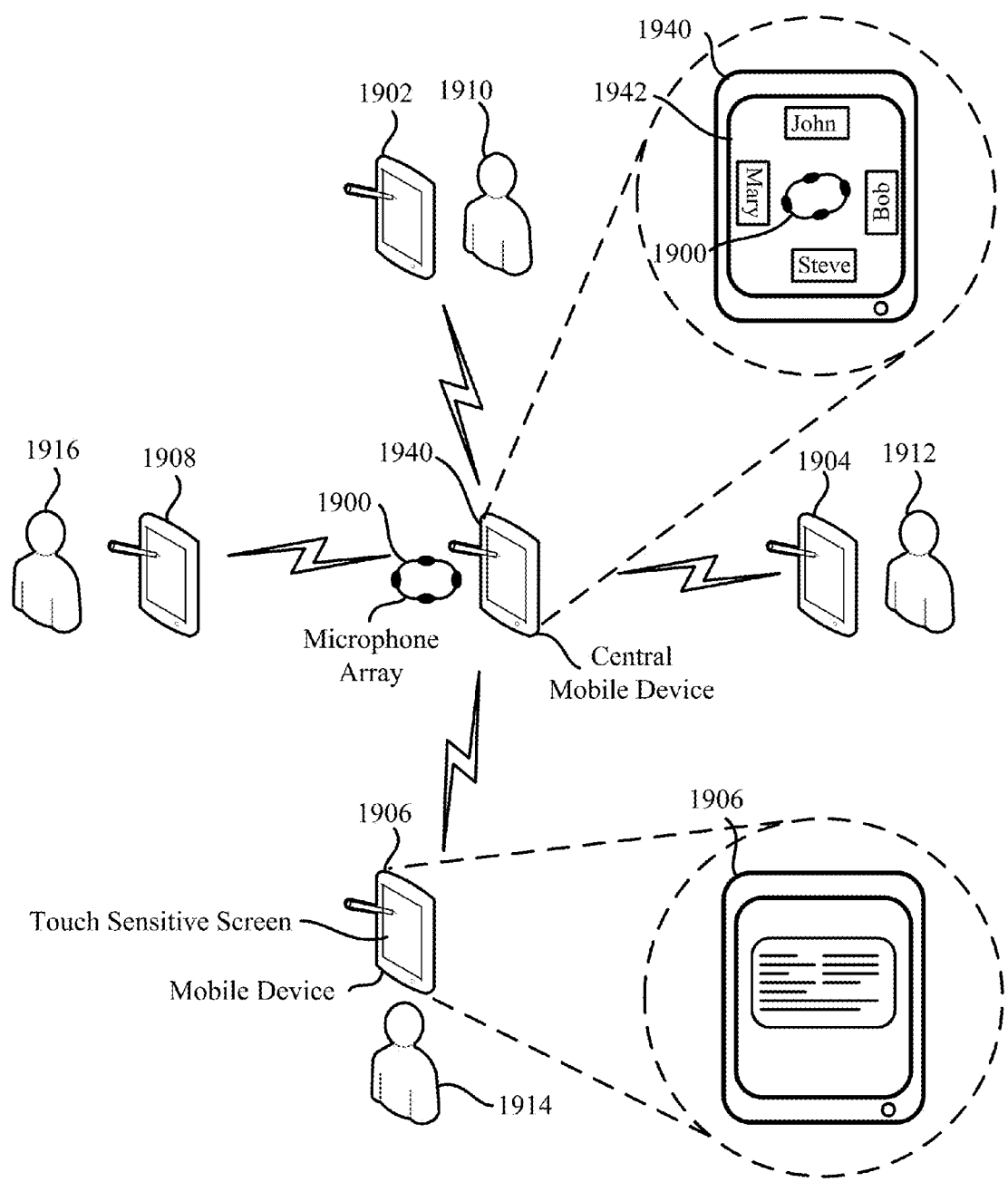
FIG. 19C illustrates another system that includes a sound transducer array, a central mobile device and several devices.

In some implementations, the device 1920 is a mobile device (e.g., tablet, handset). This may be possible when the screen size of the mobile device is sufficiently large enough for the sound transducer array 1900 to be positioned on the screen of the mobile device. In such instances, the mobile device may serve as a central mobile device (e.g., central tablet) on which the sound transducer array 1900 is positioned on. FIG. 19C illustrates an example of a configuration that include a central mobile device (e.g., central tablet). As shown in FIG. 19C, the mobile devices 1902-1908 (e.g., handset, tablet) are in communication (e.g., using Bluetooth, WiFi) with the sound transducer array 1900 and/or central mobile device 1940. The central mobile device 1940 includes a touch sensitive screen 1942, on which the sound transducer array 1900 may be placed on. It should be noted that any of the mobile devices 1902-1908 may function as a central mobile device in some implementations.

The configuration of FIG. 19C is similar to the configuration of FIG. 19B, except that device 1920 (which may be a surface table/surface tablet) of FIG. 19B has been replaced with a mobile device 1940 (e.g., tablet, smart phone), which functions as a central mobile device in communication with other mobile devices (e.g., mobile devices 1902-1908). In some implementations, the operation of the configuration shown in FIG. 19C is similar to the operation of the configurations shown and described in FIGS. 19A-19B. That is, for example, in some implementations, users may "check-in", register and/or log in with the sound transducer array 1900 and/or the central mobile device 1940 using NFC or other communication protocols/links (e.g., Bluetooth, WiFi).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, the substrate of the die may be coupled to the packaging substrate even though the substrate of the die is never directly physically in contact with the packaging substrate.

One or more of the components, steps, features, and/or functions illustrated in FIGS. 1, 2, 3, 4, 5, 6, 7, 8, 9, 10, 11, 12, 13, 14, 15, 16, 17, 18 and/or 19 may be rearranged and/or combined into a single component, step, feature or function or embodied in several components, steps, or functions. Additional elements, components, steps, and/or functions may also be added without departing from the invention.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" or "machine readable storage medium" include, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits (e.g., processing circuit), elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of representing a sound field on a physical space, the method comprising:
    capturing sound from with a sound transducer array in communication with the physical space;
    calculating a sound projection pattern of the captured sound, wherein the sound projection pattern comprises a representation of a sound field of the captured sound; and
    displaying the sound projection pattern on the physical space, the sound projection pattern extending between the sound transducer array and a location of an intended user in proximity to the physical space.

2. The method of claim 1, further comprising processing the captured sound to identify an originating location of the captured sound.

3. The method of claim 2, wherein the intended user is at the originating location of the captured sound.

4. The method of claim 1, wherein the sound transducer array comprises a separate microphone array and speaker array.

5. The method of claim 4, further comprising:
    capturing a microphone beam on the microphone array, the microphone beam displayed on the physical space in a first color; and
    transmitting a speaker beam from the speaker array, the speaker beam displayed on the physical space in a second color where the first color is different than the second color.

6. The method of claim 5, further comprising applying a color heat map to the microphone beam where a main lobe of the color heat map represents a strong signal region and color changes in the color heat map represent weaker signal regions.

7. The method of claim 1, wherein the sound transducer array comprises a combined microphone and speaker array.

8. The method of claim 7, further comprising:
    capturing a microphone beam on the sound transducer array, the microphone beam displayed on the physical space in a first color; and
    transmitting a speaker beam from the sound transducer array, the speaker beam displayed on the physical space in a second color where the first color is different than the second color.

9. The method of claim 8, further comprising applying a color heat map to the microphone beam where a main lobe of the color heat map represents a strong signal region and color changes in the color heat map represent weaker signal regions.

10. The method of claim 1, wherein the sound includes subsonic sounds, ultrasonic sounds, infrared sounds, and radio frequency sounds.

11. The method of claim 1, wherein the sound is captured in real time or near real-time.

12. The method of claim 1, wherein the sound projection pattern is displayed in real time or near real-time.

13. The method of claim 1, wherein the physical space comprises at least one of a display screen, a touch screen and a tablet.

14. The method of claim 1, wherein the sound projection pattern comprises a sound projection pattern in a form of beam patterns.

15. The method of claim 1, wherein the sound projection pattern comprises a symbol.

16. The method of claim 15, wherein the symbol comprises an arrow.

17. A sound transducer array in communication with a physical space, the sound transducer array comprising:
    a speaker array;
    a microphone array, in communication with the speaker array, for capturing sound;
    at least one processor in communication with the microphone array and configured to:
        capture the sound;
        calculate a sound projection pattern of the captured sound, wherein the sound projection pattern comprises a representation of a sound field of the captured sound; and
        display the sound projection pattern on the physical space, the sound projection pattern extending between the sound transducer array and an intended user in proximity to the physical space.

18. The sound transducer array of claim 17, wherein the at least one processor is further configured to process the captured sound to identify an originating location of the captured sound.

19. The sound transducer array of claim 18, wherein the intended user is at the originating location of the captured sound.

20. The sound transducer array of claim 17, wherein the microphone array is separate from the speaker array.

21. The sound transducer array of claim 20, wherein the at least one processor is further configured to:
    capture a microphone beam on the microphone array, the microphone beam displayed on the physical space in a first color; and
    transmit a speaker beam from the speaker array, the speaker beam displayed on the physical space in a second color where the first color is different than the second color.

22. The sound transducer array of claim 21, wherein the at least one processor is further configured to apply a color heat map to the microphone beam where a main lobe of the color heat map represents a strong signal region and color changes in the color heat map represent weaker signal regions.

23. The sound transducer array of claim 17, wherein the microphone array is combined with the speaker array.

24. The sound transducer array of claim 23, wherein the at least one processor is further configured to:
capture a microphone beam on the combined microphone and speaker array, the microphone beam displayed on the physical space in a first color; and
transmit a speaker beam from the combined microphone and speaker array, the speaker beam displayed on the physical space in a second color where the first color is different than the second color.

25. The sound transducer array of claim 24, wherein the at least one processor is further configured to apply a color heat map to the microphone beam where a main lobe of the color heat map represents a strong signal region and color changes in the color heat map represent weaker signal regions.

26. The sound transducer array of claim 17, wherein the sound includes one or more of subsonic sounds, ultrasonic sounds, infrared sounds, and radio frequency sounds.

27. The sound transducer array of claim 17, wherein the sound is captured in real time or near real-time.

28. The sound transducer array of claim 17, wherein the sound projection pattern is displayed in real-time or near real-time.

29. The sound transducer array of claim 17, wherein the physical space comprises at least one of a display screen, a touch screen and a tablet.

30. The sound transducer array of claim 17, wherein the sound projection pattern includes a sound projection pattern in a form of beam patterns.

31. The sound transducer array of claim 17, wherein the sound projection pattern comprises a symbol.

32. The sound transducer array of claim 31, wherein the symbol comprises an arrow.

33. A sound transducer array in communication with a physical space, the sound transducer array comprising:
means for capturing sound;
means for calculating a sound projection pattern of the captured sound, wherein the sound projection pattern comprises a representation of a sound field of the captured sound; and
means for displaying the sound projection pattern on the physical space, the sound projection pattern extending between the sound transducer array and a location of an intended user in proximity to the physical space.

34. The sound transducer array of claim 33, further comprising means for processing the captured sound to identify an originating location of the captured sound.

35. The sound transducer array of claim 34, wherein the intended user is at the originating location of the captured sound.

36. The sound transducer array of claim 33, wherein the sound transducer array comprises a separate microphone array and speaker array.

37. The sound transducer array of claim 36, further comprising:
means for capturing a microphone beam on the microphone array, the microphone beam displayed on the physical space in a first color; and
means for transmitting a speaker beam from the speaker array, the speaker beam displayed on the physical space in a second color where the first color is different than the second color.

38. The sound transducer array of claim 37, further comprising means for applying a color heat map to the microphone beam where a main lobe of the color heat map represents a strong signal region and color changes in the color heat map represent weaker signal regions.

39. The sound transducer array of claim 33, wherein the sound transducer array comprises a combined microphone and speaker array.

40. The sound transducer array of claim 39, further comprising:
means for capturing a microphone beam on the sound transducer array, the microphone beam displayed on the physical space in a first color; and
means for transmitting a speaker beam from the sound transducer array, the speaker beam displayed on the physical space in a second color where the first color is different than the second color.

41. The sound transducer array of claim 40, further comprising means for applying a color heat map to the microphone beam where a main lobe of the color heat map represents a strong signal region and color changes in the color heat map represent weaker signal regions.

42. The sound transducer array of claim 33, wherein the sound includes one or more of subsonic sounds, ultrasonic sounds, infrared sounds, and radio frequency sounds.

43. The sound transducer array of claim 33, wherein the sound is captured in real-time or near real-time.

44. The sound transducer array of claim 33, wherein the sound projection pattern is displayed in real-time or near real-time.

45. The sound transducer array of claim 33, wherein the physical space comprises at least one of a display screen, a touch screen and a tablet.

46. The sound transducer array of claim 33, wherein the sound projection pattern includes a sound projection pattern in a form of beam patterns.

47. The sound transducer array of claim 46, wherein the sound projection pattern comprises a symbol.

48. A non-transitory computer readable storage medium comprising one or more instructions for representing a sound field on a physical space, which when executed by at least one processor, causes the at least one processor to:
capture sound with a sound transducer array in communication with the physical space;
calculate a sound projection pattern of the captured sound, wherein the sound projection pattern comprises a representation of a sound field of the captured sound; and
display the sound projection pattern on the physical space, the sound projection pattern extending between the sound transducer array and a location of an intended user in proximity to the physical space.

49. The non-transitory computer readable storage medium of claim 48, further comprising one or more instructions which when executed by at least one processor, causes the at least one processor to process the captured sound to identify an originating location of the captured sound.

50. The non-transitory computer readable storage medium of claim 49, wherein the intended user is at the originating location of the captured sound.

51. The non-transitory computer readable storage medium of claim 48, wherein the sound transducer array comprises a separate microphone array and speaker array.

52. The non-transitory computer readable storage medium of claim 48, further comprising one or more instructions which when executed by at least one processor, causes the at least one processor to:

capture a microphone beam on the microphone array, the microphone beam displayed on the physical space in a first color; and transmit a speaker beam from the speaker array, the speaker beam displayed on the physical space in a second color where the first color is different than the second color.

53. The non-transitory computer readable storage medium of claim 48, further comprising one or more instructions which when executed by at least one processor, causes the at least one processor to apply a color heat map to the microphone beam where a main lobe of the color heat map represents a strong signal region and color changes in the color heat map represent weaker signal regions.

54. The non-transitory computer readable storage medium of claim 48, wherein the sound transducer array comprises a combined microphone and speaker array.

55. The non-transitory computer readable storage medium of claim 54, further comprising one or more instructions which when executed by at least one processor, causes the at least one processor to:

capture a microphone beam on the sound transducer array, the microphone beam displayed on the physical space in a first color; and transmit a speaker beam from the sound transducer array, the speaker beam displayed on the physical space in a second color where the first color is different than the second color.

56. The non-transitory computer readable storage medium of claim 55, further comprising one or more instructions which when executed by at least one processor, causes the at least one processor to apply a color heat map to the microphone beam where a main lobe of the color heat map represents a strong signal region and color changes in the color heat map represent weaker signal regions.

57. The non-transitory computer readable storage medium of claim 48, wherein the sound includes one or more of subsonic sounds, ultrasonic sounds, infrared sounds, and radio frequency sounds.

58. The non-transitory computer readable storage medium of claim 48, wherein the sound is captured in real-time or near real-time.

59. The non-transitory computer readable storage medium of claim 48, wherein the sound projection pattern is displayed in real-time or near real-time.

60. The non-transitory computer readable storage medium of claim 48, wherein the physical space comprises at least one of a display screen, a touch screen and a tablet.

61. The non-transitory computer readable storage medium of claim 48, wherein the sound projection pattern includes a sound projection pattern in a form of beam patterns.

* * * * *